US012695487B2

(12) United States Patent　　　(10) Patent No.:　US 12,695,487 B2
Bavand et al.　　　　　　　　　　(45) Date of Patent:　　Jul. 28, 2026

(54) SYSTEM AND METHODS FOR CONFIGURABLE EIRP RESTRICTION

(71) Applicant: Telefonaktiebolaget LM Ericsson (publ), Stockholm (SE)

(72) Inventors: Majid Bavand, Ottawa (CA); Chandra Bontu, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 522 days.

(21) Appl. No.: 18/026,873

(22) PCT Filed: Sep. 23, 2021

(86) PCT No.: PCT/IB2021/058680
§ 371 (c)(1),
(2) Date: Mar. 17, 2023

(87) PCT Pub. No.: WO2022/064413
PCT Pub. Date: Mar. 31, 2022

(65) Prior Publication Data
US 2024/0015667 A1　　Jan. 11, 2024

(30) Foreign Application Priority Data

Sep. 23, 2020　(WO) .................. PCT/IB2020/058899

(51) Int. Cl.
*H04B 7/0456*　　　(2017.01)
*H04B 7/06*　　　(2006.01)
(Continued)

(52) U.S. Cl.
CPC ......... *H04B 7/0465* (2013.01); *H04B 7/0617* (2013.01); *H04W 52/367* (2013.01); *H04W 52/42* (2013.01)

(58) Field of Classification Search
CPC . H04B 7/0465; H04B 7/0617; H04W 52/367; H04W 52/42
See application file for complete search history.

(56) References Cited

U.S. PATENT DOCUMENTS

| 11,362,713 B2 * | 6/2022 | Wigren ................ H04B 7/0617 |
| 2010/0222017 A1 * | 9/2010 | Walton .................. H04W 52/42 |
| | | 455/127.1 |

(Continued)

FOREIGN PATENT DOCUMENTS

| WO | 2017068356 A2 | 4/2017 |
| WO | 2020032856 A1 | 2/2020 |
| WO | 2020073191 A1 | 4/2020 |

OTHER PUBLICATIONS

International Search Report and Written Opinion of the International Searching Authority, PCT/IB2021/058680, mailed Feb. 8, 2022, 17 pages.

(Continued)

*Primary Examiner* — Yuwen Pan
(74) *Attorney, Agent, or Firm* — Sage Patent Group

(57) ABSTRACT

A method of operating a distributed unit, DU, of a radio network node in a wireless communication system is provided. The method includes obtaining a value of an antenna subarray gain for a radio unit, RU, connected to the DU, estimating a transmission gain associated with a first downlink channel of the RU based on the antenna subarray gain, and calculating an effective isotropically radiated power, EIRP, level for the first downlink channel based on the estimated transmission gain of the first channel. The method further includes adaptively limiting EIRP of downlink signals transmitted by the RU on the first downlink channel based on the estimated transmission gain.

15 Claims, 21 Drawing Sheets

(51) Int. Cl.
   *H04W 52/36*   (2009.01)
   *H04W 52/42*   (2009.01)

(56)                References Cited

U.S. PATENT DOCUMENTS

| | | | |
|---|---|---|---|
| 2019/0334605 | A1 | 10/2019 | Strong |
| 2020/0028558 | A1* | 1/2020 | Yerramalli .......... H04B 17/309 |

OTHER PUBLICATIONS

International Search Report and Written Opinion of the International Searching Authority, PCT/IB2020/058899, mailed May 27, 2021, 9 pages.
Huawei, "Beams and AAS-ETAC", 3GPP TSG-RAN WG4 Meeting #75 AAS AH, R4-75AH-AAS-0061, Venice, Italy, Jun. 29-Jul. 1, 2015, pp. 1-4.

* cited by examiner

110

140

150

Adaptively limiting effective isotropically radiated power, EIRP, of downlink signals transmitted on different physical channels
502

Estimating the transmission gain associated with a first channel
602

Calculating an EIRP limit for the first downlink channel based on the estimated transmission gain
604

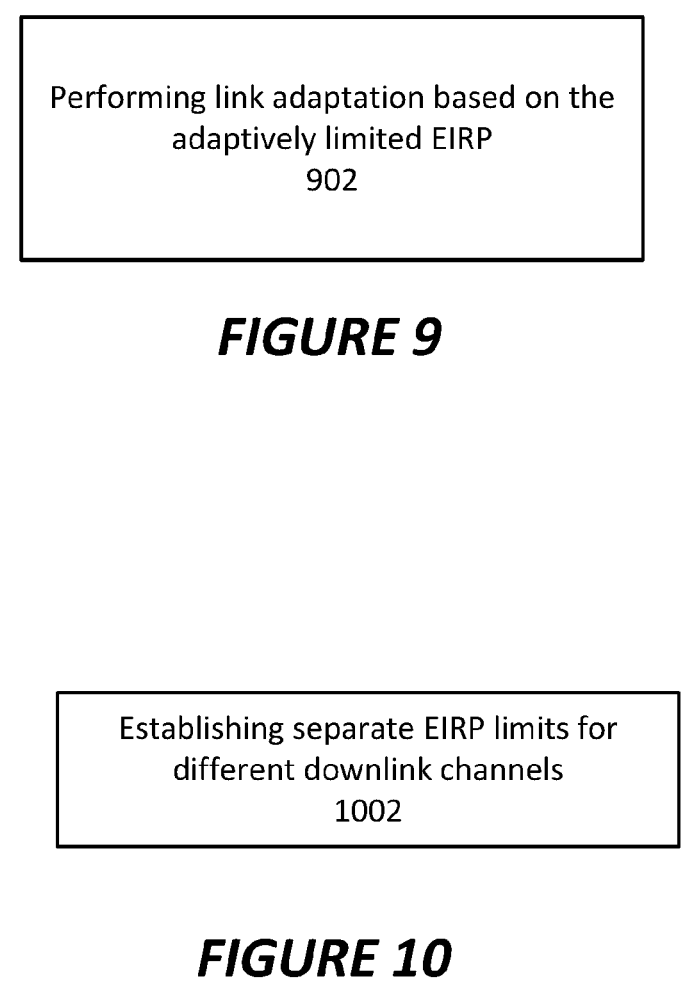

Performing link adaptation based on the adaptively limited EIRP
902

FIGURE 9

Establishing separate EIRP limits for different downlink channels
1002

FIGURE 10

BEGIN

2410
Host computer provides user data

2420
Host computer initiates transmission carrying the user data to the UE

2430
UE receives the user data

END

SYSTEM AND METHODS FOR CONFIGURABLE EIRP RESTRICTION

CROSS REFERENCE TO RELATED APPLICATIONS

This application is a 35 U.S.C. § 371 national stage application of PCT International Application No. PCT/IB2021/058680 filed on Sep. 23, 2021, which in turn claims foreign priority to International Patent Application No. PCT/IB2020/058899, filed on Sep. 23, 2020, the disclosures and content of which are incorporated by reference herein in their entirety.

TECHNICAL FIELD

The present disclosure relates to wireless communication systems, and in particular to transmission power control in multi-antenna systems.

BACKGROUND

Active antenna system (AAS) technology is a key approach adopted in 4G LTE and 5G NR wireless communication standards to enhance wireless network performance, capacity and coverage by using multi-antenna approaches, such as diversity, spatial multiplexing and beamforming. Referring to FIG. 1, a typical AAS 100 for a radio network node consists of a two-dimensional array of antenna elements 101 arranged in M rows and N columns. The radio network node is a node that includes a transmitter for transmitting downlink signals to a wireless device, and may include, for example, a base station, a gNodeB, an eNodeB, a radio unit (RU), a transmit-receive point (TXRP), etc. Each antenna element 101 has K polarizations (K=2 in case of cross-polarization) as shown in FIG. 1. Antenna arrays can be used to implement multiple input-multiple output (MIMO) transmission in a wireless communication system. When more than four antennas are used by a radio network node, the system may be referred to as "massive MIMO" or mMIMO.

In the case of massive MIMO, because of the increased number of antenna elements in the antenna array, it is possible to have narrower beams with higher coverage compared to regular MIMO systems. By producing narrower beams, it is possible to increase the coverage of a radio network node by concentrating the beam in one narrow direction.

FIG. 2 illustrates beamforming by a radio network node 110 that employs an active antenna system for massive MIMO. As shown therein, the radio network node 110 including an AAS can generate a plurality of directional beams 115 for communicating with respective user equipment (UEs) 120. The use of such beamforming, sometimes referred to as spatial beamforming, can reduce interference and/or increase throughput and/or capacity of a wireless communication system. In particular, two or more of the beams 115 shown in FIG. 2 can be used to transmit signals to respective UEs 120 using the same time/frequency resources. When UEs are scheduled using the same time/frequency resources in the uplink (UL) or downlink (DL), they are said to be "paired." Signals transmitted to two different receivers by an AAS using the same time/frequency resources are said to be transmitted on different "layers." The number of layers that can be supported is based on the number of antenna elements used by the transmitter and receiver.

By concentrating power in a narrow beam, a beamforming gain is provided. For example, doubling the number of antennas at a base station can provide a 3 dB beamforming gain. However, such a concentration of power may require operators to increase the safety distance from antenna arrays compared to systems that do not use spatial beamforming.

FIG. 3 illustrates exclusion zones 140, 150 around a radio network node 110. The exclusion zones 140, 150 have different sizes, and represent the exclusion zone applicable to workers (140) and the general public (150), with the public having a larger exclusion zone.

The size of the safety distance from a radio network node 110 represented by the exclusion zone is a mandatory regulatory requirement. Regulatory limits are set by various health organizations and governmental bodies. For example, the International Commission on Non-Ionizing Radiation Protection (ICNIRP) which is endorsed by the World Health Organization (WHO) is an international commission that specializes in determining exposure limits for electromagnetic fields used by devices, such as cellular phones and base stations. For example, the ICNIRP promulgates guidelines for limiting exposure to time-varying electric, magnetic and electromagnetic fields (100 kHz to 300 GHz).

The most important factor in electromagnetic force (EMF) exposure in human health is believed to be the thermal effect in the body, i.e., increasing body temperature. Induced rotation of polar molecules such as $H_2O$ in the body converts radio frequency (RF) energy to heat by molecular friction. Therefore, requirements by ICNIRP are imposed to limit the adverse thermal effects of electromagnetic wave propagation. On top of ICNIRP recommendations, governments may have additional mandatory requirement for limiting exposure limits of RBS systems. Based on these requirements, equipment manufacturers and operators may determine EMF limit compliance boundaries (such as exclusion zones or safety distances) for the general public and workers for each product.

SUMMARY

A method of operating a distributed unit, DU, of a radio network node in a wireless communication system is provided. The method includes obtaining a value of an antenna subarray gain, $G_{subarrayAndElement}$, for a radio unit, RU, connected to the DU, estimating a transmission gain associated with a first downlink channel of the RU based on the antenna subarray gain, and calculating an effective isotropically radiated power, EIRP, level for the first downlink channel based on the estimated transmission gain of the first channel. The method further includes adaptively limiting EIRP of downlink signals transmitted by the RU on the first downlink channel based on the estimated transmission gain.

In some embodiments, the estimated transmission gain of the first channel is estimated based on a number of multiple input multiple output, MIMO, layers transmitted on the first channel.

In some embodiments, the method includes obtaining a port-to-antenna mapping gain, $G_{p2a}$, of the RU, wherein the estimated transmission gain of the first downlink channel is based on the port-to-antenna mapping gain, $G_{p2a}$, of the RU. The estimated transmission gain of the first channel may be estimated based on one or more of a precoding gain, $G_{precoding}$, a tuning gain, $G_{tuning}$, and a boost gain, $G_{boost}$.

In some embodiments, the method includes receiving the antenna subarray gain from the RU. In some embodiments, the method includes receiving the antenna subarray gain from a local database in the DU. In some embodiments, the method includes receiving the antenna subarray gain in a network configuration.

The method may include obtaining the port-to-antenna mapping gain, $G_{p2a}$, of the RU from a local database in the DU.

Adaptively limiting the EIRP of downlink signals transmitted by the RU on the first downlink channel may include obtaining a power backoff value based on the estimated transmission gain.

The method may further include generating a scaling factor based on the power backoff value, and transmitting the scaling factor to the RU.

The method may further include generating a scaling factor based on the power backoff value, applying the scaling factor to modulated data symbols, and transmitting the modulated data symbols to the RU for transmission.

In some embodiments, the estimated transmission gain of the first channel may be based on one or more of a precoding gain, $G_{precoding}$, a port-to-antenna mapping gain, $G_{p2a}$, an antenna subarray gain, $G_{subarrayAndElement}$, a tuning gain, $G_{tuning}$, and a boost gain, $G_{boost}$.

It will be appreciated that in 3GPP, a precoder maps layers to virtual antenna ports. Port-to-antenna mapping maps the virtual ports to physical sub arrays. Port to antenna mapping gain is the beamforming gain that results from mapping a virtual to port to one or more physical antenna ports.

The first channel may be a physical downlink shared channel associated with a wireless device, and the estimated transmission gain of the first channel, $G_{pdsch}$, may be calculated as:

$$G_{pdsch} = G_{precoding} + G_{p2a} + G_{subarrayAndElement} + G_{tuning} + G_{layersplit} + G_{boost}$$

where $G_{layersplit}$ represents a gain associated with a number of MIMO layers transmitted on the first channel.

The EIRP level for the first channel may be calculated as a sum of the estimated transmission gain and the transmission power of the first channel.

The EIRP level for the first channel may be calculated as:

$$EIRP_{pdsch} = G_{pdsch} + TXPower$$

where TXPower represents the transmission power on the first channel.

The method may further include calculating an EIRP backoff as:

$$pdschEirpBackoff = max(0, EIRP_{pdsch} - maxEirpTh)$$

where maxEirpTh is a maximum EIRP threshold.

The method may further include adjusting a power of a signal transmitted on the first channel based on the EIRP backoff.

The method may further include determining if multiuser-MIMO is being used, and in response to determining that multi-user MIMO is being used, calculating the estimated transmission gain of the first channel based in part on a multiuser MIMO gain, $G_{mu}$.

The first channel may be a single user MIMO channel, and the estimated transmission gain of the first channel, $G_{pdsch}$, may be estimated based on a reciprocity precoder gain, $G_{rat}$, that represents both a precoder gain and a port-to-antenna mapping gain.

A method of operating a distributed unit, DU, of a radio network node in a wireless communication system according to further embodiments is provided. The method includes obtaining a value of single layer effective isotropic radiated power, EIRP, backoff, eirpBackoff1Layer, for single layer transmission by a radio unit, RU, connected to the DU, obtaining a layer split gain, $G_{layerSplit}$, associated with a first downlink transmission channel of the RU, and determining an EIRP backoff value based on the single layer EIRP backoff value and the layer split gain. The method further includes scaling a transmit signal using the EIRP backoff value.

The EIRP backoff value may be an EIRP backoff value for a downlink shared channel of the RU.

The EIRP backoff value, pdschEirpBackoffInDb, may be calculated as:

$$pdschEirpBackoffInDb = max(0, eirpBackoff1Layer - G_{layersplit}).$$

The EIRP backoff value may be determined based on a multi-user gain $G_{mu}$. and the EIRP backoff value, pdschEirpBackoffInDb, may be calculated as:

$$pdschEirpBackoffInDb = max(0, eirpBackoff1Layer - G_{layersplit} - G_{mu}).$$

BRIEF DESCRIPTION OF THE DRAWINGS

FIGS. 5 to 10 are flowcharts that illustrate operations of a radio network node according to some embodiments.

DETAILED DESCRIPTION

Figure 1:
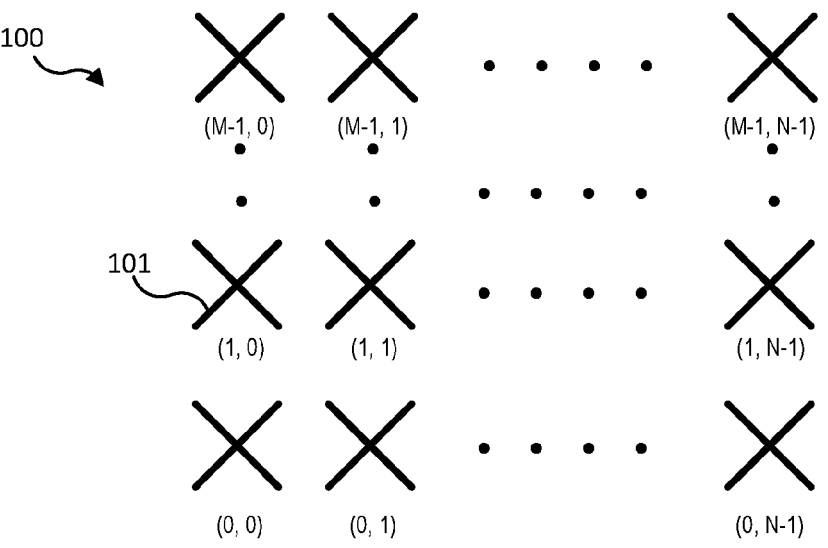
FIG. 1 illustrates a configuration of antennal elements in a MIMO antenna.
Figure 2:
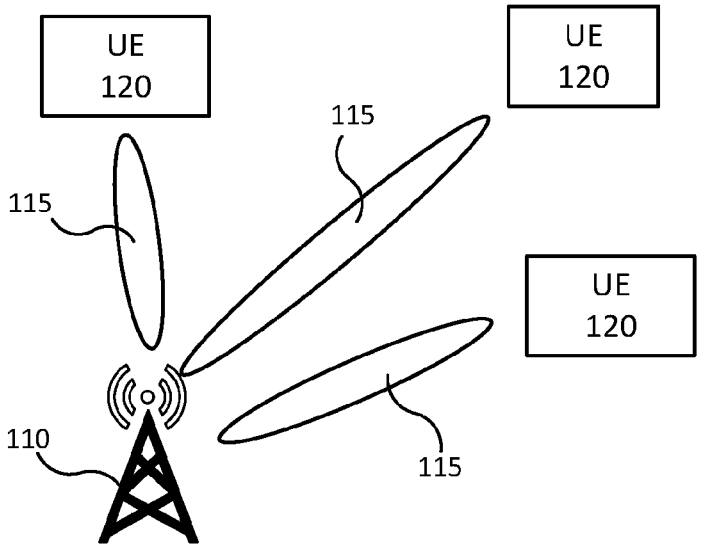
FIG. 2 illustrate transmission of antenna beams from a radio network node antenna to a plurality of UEs in a wireless communication system.
Figure 3:
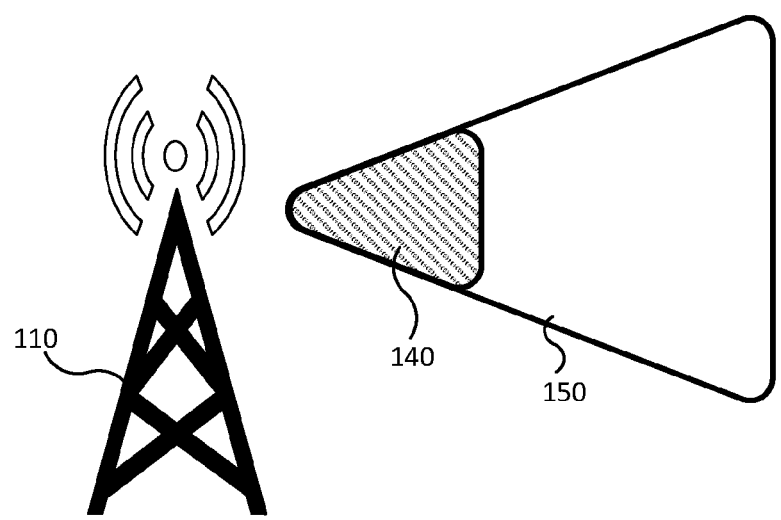
FIG. 3 illustrates exclusion zones around a radio network node antenna in a wireless communication system.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Some embodiments provide systems/methods for adaptively limiting the effective isotropically radiated power (EIRP) of downlink signals transmitted by the radio network node on different physical channels.

Effective isotropically radiated power (EIRP) is a metric that captures both transmit power and beamforming gain. EIRP is the product of transmitter power and the antenna gain in a given direction relative to an isotropic antenna of a radio transmitter. The more beamforming gain the radio network node has, the more EIRP it results in, and hence the more safety distance will be required.

Increasing the safety distance of a radio network node due to increased beamforming gain obtained thru mMIMO is problematic for practical reasons, especially in dense urban environments where base stations are closer to buildings and people. A simple way to resolve this issue and reduce the safety distance is to reduce the transmitted power of the radio network node. This approach is commonly done in practice, but may result in inefficient use of radio resources.

Downlink transmission can be categorized as feedback-based transmission or non-feedback-based transmissions. Non-feedback-based transmission can include broadcast signals or UE specific signals. For example in NR, the PBCH, PSS, SSS, and their associated DMRSs are non-feedback based channels/signals that are broadcast to all UEs in a cell. In codebook based transmissions, the PDCCH, PDSCH, and their associated DMRSs before CSI feedback (PMI/CQI/RI/CRI) are considered non-feedback-based channels/signals that are transmitted to a specific UE.

Beamforming techniques used in non-feedback-based transmissions may be called common channel beamforming, since they do not employ UE specific information. When PMI feedback is available or reciprocity-assisted transmissions (RAT) is employed, the PDSCH/PDCCH can be beamformed towards a specific UE to increase throughput and quality of service. For all these transmission modes in AAS systems, an operator may want to reduce EIRP in a certain cell. For example, there may be an agreement by operators to limit the cell EIRP in NR and LTE to reduce out of band emission probability which causes interference to other operators. As another example, there may be a requirement to limit instantaneous EIRP of the base station in cells that serve densely populated urban areas. Therefore, due to factors such as agreements among operators or strict regulatory requirements, the maximum EIRP of base stations in long-term evolution (LTE) and new radio (NR) is constrained.

EIRP limitation scales with the carrier bandwidth. For example, assume that for a 20 mhz carrier with 40 W (46 dBm) configured maximum transmit power, the EIRP of the transmitter should not exceed 63 dBm. Then for a 100 mhz carrier with 200 W (53 dBm) configured maximum transmit power, the EIRP of the transmitter should not exceed 70 dBm. Note that although the main target of such requirements is for AAS radios with large beamforming gains, non-AAS radios should also support such customer requirements. Accordingly, some embodiments described herein may apply to radios that do not include an AAS as well as those that do.

When limiting EIRP based on regulatory requirements, resource allocation in the frequency domain may be automatically adjusted to guarantee that time-averaged EIRP does not exceed a certain amount in the cell. However, because the EIRP limitation requirement scales with frequency bandwidth, adjusting resource allocation in the frequency domain may not accomplish the desired goal.

Some products reduce instantaneous EIRP by reducing a configured maximum transmission power of the NR sector carrier or by using a configurable input parameter to determine a power backoff value on only the PDSCH channel. The first approach may unnecessarily reduce the power and EIRP of all downlink channels by the same amount. Since EIRP is different in different downlink channels due to different beamforming gains (BFG), it may not be necessary to reduce the EIRP of all channels by the same amount. For example, broadcast channels/signals, such as SSB, may be transmitted with wide beams which inherently have smaller BFG compared to UE specific channels such as PDSCH, which are transmitted with narrow beams which in turn have larger BFG compared to wide beams. Therefore, it may not be needed to reduce the power of the SSB, but it may only be required to reduce PDSCH power. The second approach, which addresses this shortcoming of the first approach, does not consider the impact of number of layers in transmission. It can only apply a static backoff factor to the PDSCH.

A solution for controlling the EIRP limit according to some embodiments may enforce a threshold on EIRP and selectively apply a required backoff on all downlink channels/signals automatically. That is, by employing some embodiments described herein, operators need not calculate power backoff factors of each channel based on the beamforming gain and other EIRP related parameters of the channel. Rather, they may only need to determine their requirements on EIRP to the radio network node, and system manages the EIRP limit automatically.

Some embodiments described herein provided systems and/or methods that perform automatic power backoff on multiple downlink channels AAS-enabled and non-AAS enabled radio network nodes.

Some embodiments provide adaptive power back-off on downlink channels/signals in wireless communication systems such as systems that implement the NR or LTE standards, by considering the impact of single-layer and multi-layer SU and MU MIMO transmission. In particular, some embodiments provide new configuration management systems/methods for EIRP power backoff and/or algorithms for adaptive power adjustment to restrict EIRP.

Some embodiments adaptively adjust the power level of the PDSCH for one or more UEs in each group of resource blocks (RB) by considering the number of layers that is transmitted to the UE. Moreover, some embodiments adaptively adjust the power level of signals transmitted on channels other than the PDSCH, such as other UE-specific or common channels. Compared to previous approaches (e.g., the use of an input parameter for power backoff and configuring overall radio power), some embodiments described herein can potentially increase cell coverage and/or improve UE/Cell throughput.

In addition to adaptive power backoff, some embodiments may include changes to other aspects of radio network node operation that may improve UE/cell throughput when EIRP restriction is employed. For example, some embodiments may include an update to the PDSCH or PDCCH link adaptation (LA) algorithms update to reflect the impact of PDSCH/PDCCH power backoff. Some embodiments may include an update to the calculation of the power control offset (e.g., as represented by the NZP-CSI-RS-Resource information element IE) of one or more UEs due to PDSCH power backoff. Some embodiments may further include an update to the calculation of ss-PBCH block power (e.g., as represented by the ssb-PBCH-BlockPower IE) that is broadcast to the UE and that represents the average energy per resource element (EPRE) of the resource elements that carry secondary synchronization signals that the network used for SSB transmission.

The embodiments described herein may not increase the power of PDSCH, but rather but adjust the power back-off level on a per-channel basis.

In conventional approaches, EIRP can be controlled by reducing the configured power of the radio or/and using an input parameter to reduce transmission power of the PDSCH. However, both of these approaches may result in unnecessary throughput loss in multi-user MIMO (MU-MIMO) and multi-layer single user MIMO (SU-MIMO) transmission. Some embodiments described herein can potentially increase the cell coverage and/or improve UE/Cell throughput while complying with EIRP requirements. Additionally, the system operator may not need to know the gain of different channels and to calculate the backoff amount. The operator is only required to configure a threshold on the upper bound of EIRP, and a system/method according to embodiments described herein can automatically back-off the transmission power of downlink channels/signals including the PDSCH to satisfy the EIRP limit.

In small/medium cell macro scenarios when an operator does not configure the radio with full power, some embodiments described herein can be used instead of redundantly reducing the configured maximum transmit power (configuredMaxTxPower) of a radio network node to improve cell throughput.

Some embodiments described herein can be used to reduce electromagnetic propagation in sensitive areas for public health and electronic device protection. Moreover, some embodiments described herein can be used to reduce the safety distance and exclusion zone of the base station.

Additionally, some embodiments described herein can be used to reduce probability of out of band blocking of other operators.

Some embodiments described herein may provide instantaneous (as opposed to time-averaged) power backoff on the PDSCH with consideration of throughput degradation.

Assuming a radio network node is limited to supported up to L layers in MU-MIMO, some embodiments described herein can result in up to $10 \log_{10}(L)$ dB or more performance boost of PDSCH for each UE in codebook-based MU-MIMO transmission. Assuming the product is limited to support up to L' layers in SU-MIMO, this feature can result in up to $10 \log_{10}(L')$ dB performance boost of PDSCH for the UE in codebook-based SU-MIMO transmission (e.g., the maximum gain is achieved in L' layer transmission and some cases in 2 layer transmission). The baseline for comparison is when configuredMaxTxPower of the cell is reduced to satisfy EIRP limitation.

According to some embodiments, one configurable parameter is used to determine the maximum allowed EIRP. It is also possible to have multiple configurable parameters for each downlink channel (for example on PDSCH, PDCCH, TRS, SSB, etc.). By using multiple configurable parameters, an operator can control the EIRP of each channel/signal independently to achieve a balanced link budget on different downlink channels to improve power consumption of the base station and for better cell planning.

Configuration Management

In some embodiments, an EIRP limit is provided for one or more downlink channels, or each downlink channel is provided with a different EIRP limit. There are several possible configuration approaches for providing an EIRP limit, some of which are described below.

Configuration Management Embodiment 1—One EIRP Density Limit

According to some embodiments, an EIRP density limit is provided that can be applied to all DL channels and all bandwidths. An EIRP density limit (e.g., eirpDensity) may be provided to define a maximum allowed EIRP per unit of bandwidth, e.g., an EIRP limit per MHz. The value of EIRP density can be in log scale or linear scale.

The EIRP limit can then be calculated based on the DL bandwidth and EIRP density, for example if eirpDensity is in dBm/MHz and downlink bandwidth, d/BW, is in MHz, then the EIRP limit can be calculated as:

$$\text{EIRP (dBm)} = \text{eirpDensity} + 10 \log 10(\text{dlBW})$$

Configuration Management Embodiment 2—Multiple EIRP Density Limit

In some embodiments, multiple EIRP density limits may be provided. Each EIRP density limit may be applied to one or multiple DL channels.

For example, an EIRP density in frequency may be defined for DL channel X (e.g., eirpDensityX) as a maximum allowed EIRP per a unit of bandwidth for channel X, e.g., an EIRP limit per MHz for channel X. The value of EIRP density can be in log scale or linear scale.

In addition, an EIRP density in frequency may be defined for DL channel Y (e.g., eirpDensityY) as a maximum allowed EIRP per unit bandwidth for channel Y, e.g., an EIRP limit per MHz for channel Y.

The EIRP limit for each channel can be calculated based on the DL bandwidth and EIRP density associated with the channel For example if eirpDensityX is in expressed W/MHz and downlink bandwidth band (dlBW), is in MHz, then the EIRP limit can be calculated as:

$$\text{EIRP (W)} = \text{eirpDensity}X \times \text{dlBW}$$

Configuration Management Embodiment 3—One EIRP Limit

According to some embodiments, one EIRP limit may be provided that can be applied to all DL channels and for the given bandwidth.

For example, a parameter EIRP may be defined that corresponds to the maximum allowed EIRP for the configured frequency bandwidth. The value of EIRP limit (EIRP) can be in log scale (dBm or dBW or etc,) or linear scale (W or mW or etc.).

Configuration Management Embodiment 4—Multiple EIRP Limits

According to further embodiments, multiple EIRP limits may be provided. For example, an EIRP limit may be defined for one or multiple DL channels for a given bandwidth.

In an example, a value of EIRP for DL channel X (eirpX) may be defined as the maximum allowed EIRP for the configured bandwidth of the cell for channel X, where the value of EIRP can be in log scale or linear scale. In addition, a value of EIRP for DL channel Y (eirpY) may be defined as the maximum allowed EIRP for the configured bandwidth of the cell for channel Y, where the value of EIRP can be in log scale or linear scale.

Configuration Management Embodiment 5 (Multiple Power Backoff Values)

As noted above, one conventional approach for EIRP restriction is based on an input parameter where the power backoff value of the PDSCH channel is provided by the operator. Some embodiments provide an extension to the concept of an input parameter by providing multiple power backoff values, e.g., one for each DL channel or for multiple DL channels, which are to be given as an input for the given bandwidth.

In an example, a power backoff for a DL channel X (backoffX) may be defined, where the value of backoffX can be in log scale or linear scale. In addition, a power backoff for DL channel Y (backoffY) may be defined, where the value of backoffX can be in log scale or linear scale.

According to some embodiments, a power backoff may be statically or dynamically applied to different downlink channels/signals to limit EIRP.

Power Control Embodiment 1—Static Power Backoff as Input

In a first embodiment, a static power control approach may be used in connection with a configuration management scheme in which multiple power backoff values are provided for different channels or groups of channels. In this embodiment, the power backoff values are applied to their corresponding downlink channels.

In some embodiments, the power backoff value is provided in linear scale as a scaling factor. Before DL channels become indistinguishable in the radio network node, the scaling factor is multiplied in the digital or analog domain by the amplitude of the transmit signals. In other embodiments, the scaling factor could be multiplied with the precoder, initial power, or any other operation during downlink transmission. This approach requires operator to have knowledge of different level of beamforming gains in addition to any power related boosting/deboosting operation on each downlink channel in the system.

Power Control Embodiment 2—Power Backoff for Codebook Based SU-MIMO

In this and the following embodiments, it is assumed that the given input on EIRP is already scaled if necessary and that the EIRP threshold on the full bandwidth is available (referred to herein as maxEirpThreshold).

In this embodiment, the transmission gain or loss of the UE specific channels, for example the PDSCH channel, is calculated. Then, EIRP is calculated based on the gain/loss and transmission power of the cell/sector carrier. If EIRP exceeds the threshold maxEirpThreshold, the radio network node applies a corresponding backoff to the transmit power of the channel.

An important aspect in calculating the gain/loss factor is the impact of multi-layer transmission. If multiple layers are transmitted, the transmit power is split among the layers. Therefore, if the layers are sent in different directions, EIRP will be reduced, which will result in less power backoff and consequently more coverage and throughput.

The gain/loss factor due to splitting power among layers is represented as $G_{layersplit}$ in the algorithm below. Other factors that can impact EIRP calculation of the PDSCH channel in codebook based SU-MIMO transmission are the gain resulting from antenna subarray with isotropic or non-isotropic antenna elements ($G_{subarrayAndElement,max}$), the gain resulting from precoding ($G_{precoding}$), the gain resulting from port to antenna mapping ($G_{p2a}$, max), the gain resulting from power boosting/deboosting ($G_{boost}$), and a gain adjustment based on a tuning parameter that could adjust the EIRP calculation based on practical measurements ($G_{tuning}$).

In general, a gain (represented in decibels, dB) may be negative or positive. That is, a gain can represent a boosting or deboosting effect. For example the layer split gain ($G_{layersplit}$) is always negative or zero.

The following algorithm can be used for power backoff:

Algorithm 1:

1.0    The parameters $G_{subarrayAndElement,max}$, $G_{tuning}$, TransmissionPowerInDb, maxEirpThreshold are provided for each Cell/Sector Carrier, where TransmissionPowerInDb represents transmission power in decibels.

-continued

---

Algorithm 1:

---

2.0    Then, for each UE:

2.1    The parameters $G_{p2a,\ max}$, $G_{boost}$, nrofCsirsPorts, nroflLayers are provided, where nrofCsirsPorts represents the number of CSI-RS ports configured at the UE, and nroflLayers represents the number of layers configured for the UE.

2.2    $G_{precoding} = 10\ \log_{10}(\text{nrofCsirsPorts}/2)$ is calculated.

2.3    If (number of transmission layers is one) or (number of transmission layers is greater than one and two layers are transmitted on the same directions but different polarizations), then $G_{layerSplit} = 10\log_{10}(1/\text{nrofLayers})$ else $G_{layerSplit} = 10\log_{10}(2/\text{nroflLayers})$ End 2.4    $G_{pdsch}$ is calculated for the UE's PDSCH as:

$G_{pdsch} = G_{precoding} + G_{p2a,\ max} + G_{subarrayAndElement,max} + G_{tuning} + G_{layerSplit} + G_{boost}$ 2.5    EIRP for the UE's PDSCH is calculated as:

$EIRP_{pdsch} = G_{pdsch} + \text{TransmissionPowerInDb}$ 2.6    The backoff for the UE's PDSCH is then calculated as:

pdsch EirpBackoffInDb = $\max(0, EIRP_{pdsch}\text{-maxEirpTh})$ 2.7.    Update information carrying capacity (ICC) and SINR calculation of SU-MIMO PDSCH link adaptation based on the calculated backoff value.

2.8    The EIRP backoff (linear value) is then calculated as:

$$pdschEirpBackoffLinear = 10^{\frac{-pdschEirpBackoffIndB}{20}}$$

2.9    The amplitude of the transmit signal is then multiplied by pdschEirpBackoffLinear.

3.0    End of algorithm

---

Power Control Embodiment 3—Power Backoff for Codebook Based MU-MIMO

Similar to power control embodiment 2 above, in this embodiment, the transmission gain or loss of the UE specific channels, such as the PDSCH channel, is calculated. Then, EIRP is calculated based on the gain/loss and transmission power of the cell/sector carrier. If EIRP exceeds the EIRP threshold maxEirp Threshold, a backoff is applied to the transmit power of the channel.

An important difference with SU-MIMO is the possible variation of power allocation (backoff) in each group of resource blocks. It is possible that in one physical resource block (PRB) there are L users scheduled for concurrent MU transmission, but in the next PRB, there are L' users co-scheduled for MU transmission. Additionally, MU-MIMO may result in additional processing which could change the transmission gain/loss and therefore EIRP. This gain/loss maybe represented by the factor $g_{MU}$. That is, $G_{mu}$ also contains the relevant gains loss due to taper loss that may exist in MU-MIMO transmission for inter-layer interference reduction.

The following algorithm can be used for power backoff for both SU and MU transmissions:

---

Algorithm 2:

---

1.0    The parameters $G_{subarrayAndElement,max}$, $G_{tuning}$, TransmissionPowerInDb, maxEirpThreshold are provided for each Cell/Sector Carrier.

2.0    For each UE:

2.1    The parameters $G_{p2a,\ max}$, $G_{boost}$, nrofCsirsPorts, nroflLayers and $g_{MU}$ are provided.

2.2    $G_{precoding} = 10\ \log_{10}(\text{nrofCsirsPorts}/2)$ is calculated.

2.3    Then, for each PRB, resource block group (RBG) or group of PRBs:

2.3.1    The parameter nroflTotalLayers is provided,which represents the total number of layers of all UEs that are co-scheduled for MU transmission in this RBG.

2.3.2    If (number of transmission layers of the UE in this RBG is one) or (number of transmission layers of the UE in this RBG is greater than one and two layers are transmitted on the same directions but different polarizations), then $G_{layerSplit} = 10\log_{10}(1/\text{nrofTotalLayers})$ else $G_{layerSplit} = 10\log_{10}(2/\text{nroflTotalLayers})$ End 2.4    If MU-MIMO, then $G_{mu} = g_{MU}$ else $G_{mu} = 0$ End 2.5    $G_{pdsch}$ is calculated for the PRB/RBG/group of RBs as:

$G_{pdsch} = G_{precoding} + G_{p2a,\ max} + G_{subarrayAndElement,max} + G_{tuning} + G_{layerSplit} + G_{boost} + G_{mu}$ -continued

---

Algorithm 2:

---

2.6  EIRP for the PDSCH is calculated as:
     $EIRP_{pdsch} = G_{pdsch} + TransmissionPowerInDb$
2.7  The backoff for the PDSCH is then calculated as:
     pdschEirpBackoffInDb = max(0, $EIRP_{pdsch}$-maxEirpTh)
2.8.  Update information carrying capacity (ICC) and SINR calculation of SU-
MIMO PDSCH link adaptation based on the calculated backoff value.
2.9  The EIRP backoff (linear value) is then calculated as:

$$pdschEirpBackoffLinear = 10^{\frac{-pdschEirpBackoffInDB}{20}}$$

2.10  The amplitude of the transmit signal is then multiplied by
pdschEirpBackoffLinear.
3.0  End of algorithm

---

Power Control Embodiment 4—Power Backoff on SU And MU RAT

Similar to Power Control Embodiment 3 above, in this embodiment, the transmission gain or loss of the UE specific gain, $G_{rat}$, which is estimated or approximated based on the maximum gain of the precoder for different layers of each UE.

The following algorithm can be used for power backoff for both SU and MU transmissions:

---

Algorithm 3:

---

1.0  The parameters $G_{subarrayAndElement,max}$, $G_{tuning}$, TransmissionPowerInDb,
maxEirpThreshold are provided for each Cell/Sector Carrier.
2.0  For each UE:
     2.1  The parameters $G_{boost}$, nroflLayers and $g_{MU}$ are provided.
     2.2  Then, for each PRB, resource block group (RBG) or group of PRBs:
          2.3.1  The parameter nroflTotalLayers is provided.
          2.3.2  If (number of transmission layers of the UE in this RBG is one)
     or (number of transmission layers of the UE in this RBG is greater than one
     and two layers are transmitted on the same directions but different
     polarizations), then
               $G_{layerSplit} = 10log_{10}(1/nroflTotalLayers)$
          else
               $G_{layerSplit} = 10log_{10}(2/nroflTotalLayers)$
          End
     2.4  If MU-MIMO, then
                    $G_{mu} = g_{MU}$
          else
                    $G_{mu} = 0$
          End
     2.5  Approximate $G_{rat}$.
     2.5  $G_{pdsch}$ is calculated for the PRB/RBG/group of RBs as:
          $G_{pdsch} = G_{rat} + G_{subarrayAndElement,max} + G_{tuning} + G_{layerSplit} + G_{boost} +$
$G_{mu}$
     2.6  EIRP for the PDSCH is calculated as:
          $EIRP_{pdsch} = G_{pdsch} + TransmissionPowerInDb$
     2.7  The backoff for the PDSCH is then calculated as:
          pdschEirpBackoffinDb = max(0, $EIRP_{pdsch}$-maxEirpTh)
     2.8.  Update information carrying capacity (ICC) and SINR calculation of SU-
     MIMO PDSCH link adaptation based on the calculated backoff value.
     2.9  The EIRP backoff (linear value) is then calculated as:

$$pdschEirpBackoffLinear = 10^{\frac{-pdschEirpBackoffIndB}{20}}$$

2.10  The amplitude of the transmit signal is then multiplied by
     pdschEirpBackoffLinear.
3.0  End of algorithm

--- channels, such as the PDSCH channel, is calculated. Then, EIRP is calculated based on the gain/loss and transmission power of the cell/sector carrier. If EIRP exceeds the EIRP threshold maxEirpThreshold, then a backoff is applied to the transmit power of the channel. The difference with code-book-based SU MIMO is that ($G_{precoding}$) and ($G_{p2a,max}$) cannot be separated. The two gains are combined and calculated as one gain, referred to as the reciprocity precoder

Power Control Embodiment 5—Power Backoff on Other Downlink Channels

In NR, all other channels than PDSCH only support single layer transmissions. Thus, in some embodiments, Algorithm 1 that was proposed for Power Control Embodiment 2 may be used for all other channels with a small modification to the gain/loss calculation. In particular, the gain/loss calculation of each channel may be calculated separately, e.g.: For CSI-RS:

$$G_{csi\text{-}rs} = G_{p2a,max} + G_{subarrayAndElement,max} + G_{boost} + G_{tuning} \text{ and}$$

$$EIRP_{csi\text{-}rs} = G_{csi\text{-}rs} +$$

$$TransmissionPowerInDb\text{-}10\log_{10}\frac{nrofAntennaPorts}{nrofCsirsPorts} \times cdmGroupSize$$

For PDCCH:

$$G_{pdcch} = G_{pdcch} + G_{subarrayAndElement,max} + G_{boost} + G_{tuning}$$

$$EIRP_{pdcch} = G_{pdcch} + TransmissionPowerInDb$$

For TRS:

$$G_{trs} = G_{trs} + G_{subarrayAndElement,max} + G_{boost} + G_{tuning}$$

$$EIRP_{trs} = G_{trs} + TransmissionPowerInDb$$

For SSB:

$$G_{ssb} = G_{ssb} + G_{subarrayAndElement,max} + G_{boost} + G_{tuning}$$

$$EIRP_{ssb} = G_{ssb} + TransmissionPowerInDb$$

In the above calculations, the downlink channels may employ spatial filters that may vary among different transmission instances of the channel, and may result in different gains per spatial filter (e.g., $G_{ssb}$, $G_{p2a\text{-}max}$, etc.). In such cases, the radio network node applies the associated maximum gain value for the associated spatial filter for each transmission instance.

In cases where received CSI-RS power level is required to be associated with received PDSCH power at the receiver side, if the EIRP related power back off (in dB) is smaller than the maximum attainable power back-off for PDSCH by some threshold value $\delta_{th}$, then the gNB may apply an additional power backoff value of $\Delta_{csi\text{-}rs}=f(\delta_{th}, N_{CDM})$ to the CSI-RS power value $EIRP_{csi\text{-}rs}$ where $N_{CDM}$ is the number of CSI-RS pilot tones superposed on the same resource elements. The function $f(\ )$ can be selected along with the adaptive MCS link-adaptation parameters informed to the receiver.

Power Control Embodiment 6—Directional Power Backoff on UE Specific Transmission Considering the fact that radiation pattern of antenna subarray is not is isotropic in most cases, further improvements can be made to the system performance (in terms of throughput and coverage) by considering a 2D or 3D direction radiation pattern instead of using the maximum gain. This approach is only applicable to UE specific signals with UE specific beamforming. That is, the beam should be directed towards a different direction than the broadside of the array. The general format of the algorithm is similar to Algorithm 2 above. In this case, for codebook-based SU and MU precoding of PDSCH channel the gain/loss factor can be expressed as:

$$G_{pdsch} = G_{precoding} + G_{p2a}(\phi, \theta) +$$

$$G_{subarrayAndElement}(\phi, \theta) + G_{tuning} + G_{layersplit} + G_{mu} + G_{boost}$$

where $\phi$, $\theta$ are spherical coordinates.

In this embodiment, direction estimation is needed for determining the propagation direction of each layer of each UE. For each UE, the direction closest to the boresight would be selected for gain calculation. In other words, the maximum gain among the layers is selected to guarantee that the EIRP restriction is never violated.

For systems with precoder matrix indices that are fed back to the radio network node, a look-up table can be generated per PMI, or azimuth and elevation indices of the PMI if it has more than one dimension. This table contains, for each PMI index, the antenna element or subarray gain corresponding to the direction at which the PMI creates maximum directivity. The table may include the impact of only azimuth, only elevation, or both azimuth and elevation beamforming (3D beamforming) related gains. Based on the PMI index used for transmission, the radio network node may reduce the power back-off value by the difference between maximum subarray gain attainable and the gain corresponding to the PMI index.

Figure 4:
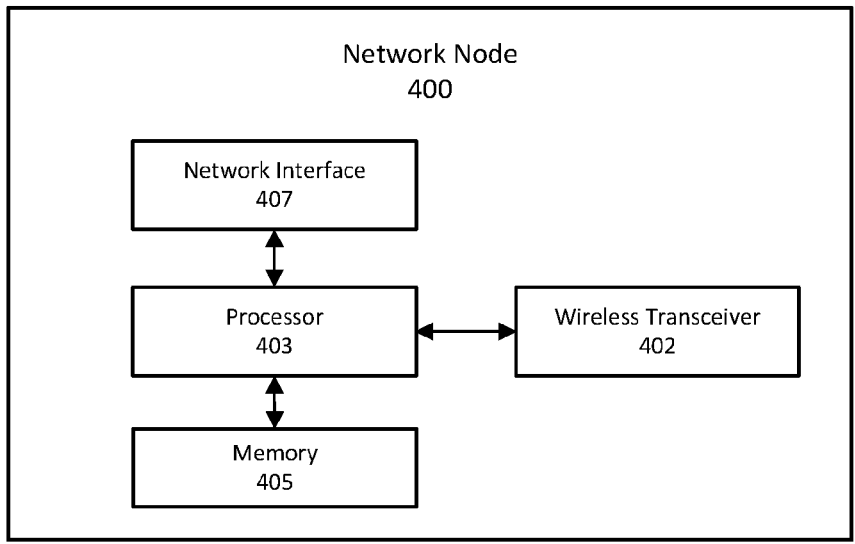
FIG. 4 is a block diagram illustrating a radio network node according to some embodiments of the inventive concepts.

FIG. 4 is a block diagram illustrating elements of a network node 400 of a communication system. The network node 400 may correspond to a RAN node, or portion of a RAN node, that includes a wireless transceiver and transmit antenna, such as a radio base station, a transmit-receive point (TXRP), a radio unit (RU), etc. For example, the radio network node 400 may implement a gNodeB or eNodeB.

As shown, the network node may include a network interface circuit 407 (also referred to as a network interface) configured to provide communications with other nodes (e.g., with other base stations, RAN nodes and/or core network nodes) of the communication network. The network node 400 may also include a wireless transceiver circuit 402 for providing a wireless communication interface with UEs. The radio network node 400 may also include a processor circuit 403 (also referred to as a processor) coupled to the transceiver circuit 402 and the network interface 407, and a memory circuit 405 (also referred to as memory) coupled to the processor circuit. The memory circuit 405 may include computer readable program code that when executed by the processor circuit 403 causes the processor circuit to perform operations according to embodiments disclosed herein. According to other embodiments, processor circuit 403 may be defined to include memory so that a separate memory circuit is not required.

As discussed herein, operations of the radio network node may be performed by processor 403, the wireless transceiver circuit 402 and/or the network interface 407. For example, the processor 403 may control the network interface 407 to transmit communications through network interface 407 to one or more other radio network nodes and/or to receive communications through network interface from one or more other radio network nodes. Moreover, modules may be stored in memory 405, and these modules may provide instructions so that when instructions of a module are executed by processor 403, processor 403 performs respective operations (e.g., operations discussed herein with respect to Example Embodiments).

Figures 5, 6:
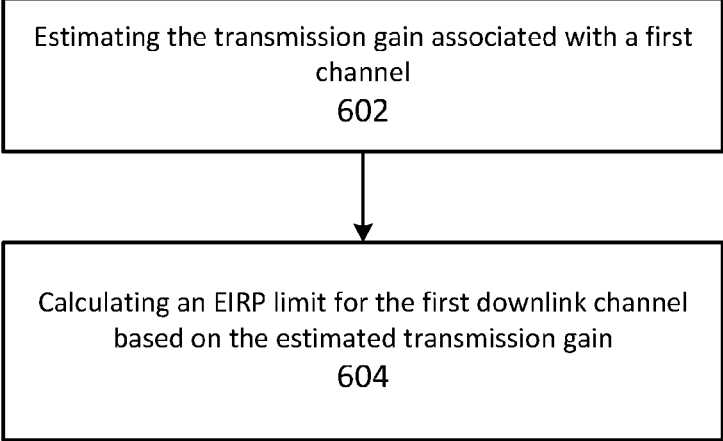

FIG. 5 illustrates operations of a radio network node according to some embodiments. Referring to FIG. 5, a radio network node according to some embodiments adaptively limits the EIRP of downlink signals transmitted by the radio network node on different physical channels (block 502).

Referring to FIGS. 4 and 5, a radio network node (400) according to some embodiments is configured to perform operations of adaptively limiting the EIRP of downlink signals transmitted by the radio network node on different physical channels (block 502).

In some embodiments, the radio network node may adaptively limit the EIRP of downlink signals by limiting the EIRP of downlink signals on different physical channels based on transmission gains associated with the different physical channels.

In some embodiments, the radio network node may adaptively limit the EIRP of downlink signals by limiting the EIRP of downlink signals on different physical channels based on a number of multiple input multiple output, MIMO, layers transmitted on the different physical channels.

In some embodiments, the radio network node may adaptively limit the EIRP of downlink signals by establishing a single EIRP density limit for all downlink channels, wherein EIRP density comprises an EIRP per unit of downlink bandwidth.

In some embodiments, the radio network node may adaptively limit the EIRP of downlink signals by establishing a single EIRP limit for all downlink channels.

In some embodiments, the EIRP limit is generated based on the EIRP density limit and a downlink bandwidth of the downlink signals.

The EIRP limit may be calculated as $EIRP_{limit}=eirpDensity+10\log_{10}(BWDL)$, where eirpDensity is the EIRP density limit and BWDL is the downlink bandwidth for downlink signals.

In some embodiments, the radio network node may adaptively limit the EIRP of downlink signals by establishing separate EIRP limits for different downlink channels.

In some embodiments, the radio network node may adaptively limit the EIRP of downlink signals by establishing separate EIRP density limits for different downlink channels, wherein EIRP density comprises an EIRP per unit of downlink bandwidth.

In some embodiments, the radio network node may adaptively limit the EIRP of downlink signals by establishing separate power backoff levels for different downlink channels.

Referring to FIG. 6, in some embodiments, the method includes estimating the transmission gain associated with a first downlink channel (block 602), and calculating an EIRP level for the first downlink channel based on the estimated transmission gain of the first channel (block 604).

The estimated transmission gain of the first channel may be based on a number of multiple input multiple output, MIMO, layers transmitted on the first channel.

In some embodiments, the estimated transmission gain of the first channel may be based on one or more of a precoding gain, $G_{precoding}$, a port-to-antenna mapping gain, $G_{p2a}$, a beamforming gain, $G_{subarrayAndElement}$, a tuning gain, $G_{tuning}$, and a boost gain, $G_{boost}$.

The first channel may be a physical downlink shared channel associated with a wireless device, and the estimated transmission gain of the first channel, $G_{pdsch}$, may be calculated as:

$$G_{pdsch}=G_{precoding}+G_{p2a}+G_{subarrayAndElement}+G_{tuning}+G_{layersplit}+G_{boost}$$

where $G_{layersplit}$ represents a gain associated with a number of MIMO layers transmitted on the first channel.

The EIRP level for the first channel may be calculated as a sum of the transmission gain and the transmission power of the first channel. For example, the EIRP level for the first channel may be calculated as $EIRP_{pdsch}=G_{pdsch}+TXPower$, where TXPower represents the transmission power on the first channel.

The method may further include calculating an EIRP backoff as pdschEirpBackoff=max(0, EIRPpdsch−maxEirpTh), where maxEirpTh is a maximum EIRP threshold.

The method may further include adjusting a power of a signal transmitted on the first channel based on the EIRP backoff.

Figure 7:
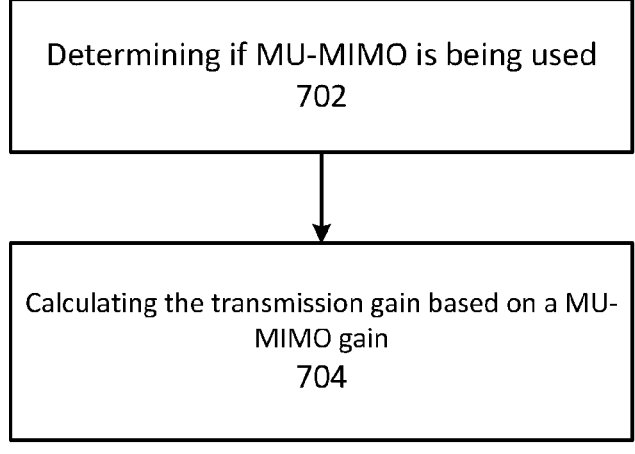

Referring to FIG. 7, the method may further include determining if multiuser-MIMO is being used (block 702), and in response to determining that multi-user MIMO is being used, calculating the transmission gain of the first channel based in part on a multiuser MIMO gain, $G_{mu}$ (block 704).

The first channel may be a single user MIMO channel, the estimated transmission gain of the first channel, $G_{pdsch}$, may be based on a reciprocity precoder gain, $G_{rar}$, that represents both a precoder gain and a port-to-antenna mapping gain.

The first downlink channel may be a physical downlink shared channel, PDSCH, a physical downlink control channel, PDCCH, a synchronization signal block, SSB, a channel state information reference signal, CSI-RS, a demodulation reference signal, DMRS, or a tracking reference signal, TRS.

Figure 8:
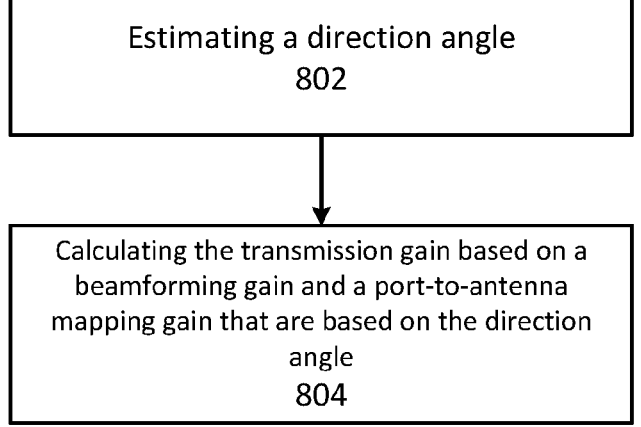

Referring to FIG. 8, the method may further include estimating a direction angle toward a wireless device associated with the first downlink channel, wherein the beamforming gain $G_{subarrayAndElement}$ and the port-to-antenna mapping gain $G_{p2a}$ are based on the direction angle.

Referring to FIG. 9, the method may further include performing link adaptation of at least one downlink channel based on the adaptively limited EIRP of the downlink signals (902).

Referring to FIG. 10, the method may further include updating a power control offset of a user equipment based on the adaptively limited EIRP of the downlink signals (1002).

Referring to FIGS. 4 and 5, a radio network node (400) according to some embodiments includes a processing circuit (403), a transceiver (402) coupled to the processing circuit, and a memory (405) coupled to the processing circuit. The memory includes computer-readable program instructions that, when executed by the processing circuit, cause the processing circuit to perform operations of adaptively limiting the EIRP of downlink signals transmitted by the radio network node on different physical channels (block 502).

Figure 11:
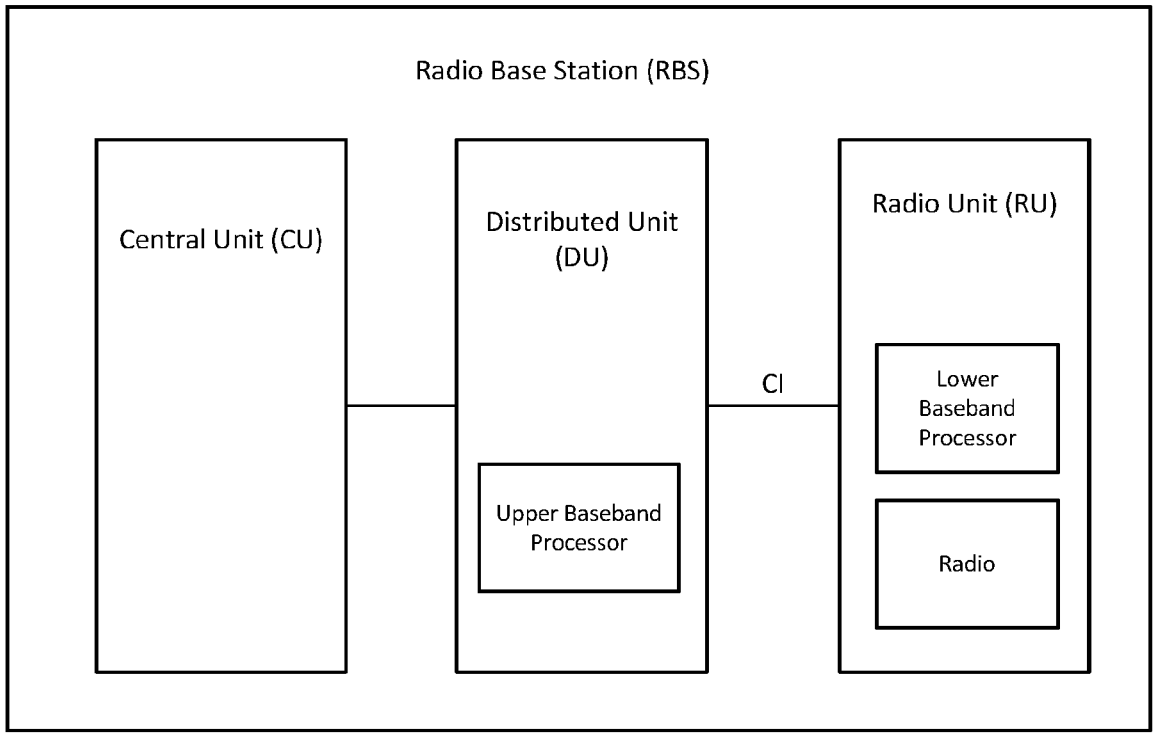
FIG. 11 is a block diagram of a radio base station having a lower layer split architecture in accordance with some embodiments.

Some embodiments described herein can be employed in a radio area network that employs a lower-layer split architecture, such as the one illustrated in FIG. 11. As shown therein, some functionality of radio base station (RBS), such as the gNodeB of a New Radio communication system, can be split and divided across a Central Unit (CU), a Distributed Unit (DU) and a Radio Unit (RU). In an Open Radio Access Network (ORAN) environment, these nodes are referred to as a O-CU, O-DU and O-RU, respectively. For simplicity, only the terms CU, DU and RU will be used below.

The RU is responsible for parts of the physical layer, the DU performs L1 and L2 scheduling functions, and the CU performs higher L2 and L3 functions.

In particular, the RU provides a digital front end (DFE) and part of the PHY layer as well as digital beamforming functionality. The DU provides RLC and MAC functionality and parts of the PHY layer. For example, the DU may perform intense processing tasks such as fast Fourier transform/inverse fast Fourier transform (FFT/IFFT). The RU may implement some physical layer functionality using a lower baseband processor, while the DU may implement some physical layer functionality using an upper baseband processor. The DU is controlled by the CU, which provides the RRC and PDCP layers.

Some embodiments described herein are concerned with performing power control using the DU and/or RU to accommodate a DU/RU split. In various embodiments, some or all of the power control methods may be implemented in the DU, while some or all may be implemented in the RU.

In this architecture, the parameter $G_{subarrayAndElement,max}$ is a radio dependent parameter that is stored in a database/table in the RU's radio module or lower BB module and is passed to (and used in) the DU via a control interface CI between the OU and RU. The parameter $G_{tuning}$, is a configurable system constant that is provided based on measurement in the field/chamber and is used to adjusts the gains in the algorithm in DU. The parameter Transmission-PowerInDb is calculated and used in DU based on configured power of the sector carrier by the operator and possible restrictions that might have been applied by the radio capability and licensing availability for the operator. This parameter is also used in the DU. The parameter maxEirp-Threshold is provided by the operator and is available and used in the DU. The parameter $G_{p2a,max}$ is the gain of the port to antenna mapping function which depends on the antenna specification (i.e. it is a radio-dependent parameter) and is stored in a database/table in the RU's radio module or lower BB module and is passed to (and used in) DU via existing C2CCI interface.

The parameter $G_{boost}$, is defined in 3GPP TS 38.211 and is the power boost of the applicable channel that is provided via a Managed Object Model (MOM) configuration by the operator and is used in the DU. The parameter nrofCsir-sPorts, is configured via MOM by the operator and possibly is finalized by handshaking with UE. It is used in the DU. The parameter nroflLayers is provided by UE CSI feedback (to be more specific by rank indicator that is available in csi feedback) and may be overridden by the DU. It is also used in the DU. The parameter pdschEirpBackoffInDb is calculated in the DU as it is needed to updated link adaptation algorithm based on this value and is passed to RU, so lower BB can apply power backoff in final transmission (to be more specific power backoff for 1 layer transmission is passed to the DU for each CSI-RS configuration to reduce the size of control data that is transmitted to the RU and the RU recalculates the backoff of value of each UE in each RBG).

The communication protocols needed to pass information (such as pdschEirpBackoffInDb, $G_{subarrayAndElement,max}$, $G_{p2a,max}$) between DU and RU are not supported by ORAN. Some embodiments described herein enable the systems/ methods described above to be implemented in ORAN supported architecture.

According to some embodiments, EIRP can be efficiently limited in radio units manufactured by different providers with minimal negative impact on the throughput. Moreover, as described above, a limitation on EIRP instead of transmit power may result in more efficient power consumption (although not necessarily less power consumption) and consequently provide better throughput in a cell.

In ORAN Category A, the precoding function is performed in the DU, which allows the RU design to be simplified. With this design, the fronthaul (FH) interface carries spatial streams, which can be larger than layers, in the DL. In ORAN Category B, the precoding function is performed in the RU, which makes the RU design more complex. With this design, the FH interface carries layers rather than spatial streams in the DL. Some embodiments described herein may be employed one or both of the CAT-A architecture and the CAT-B architecture.

Figure 12:
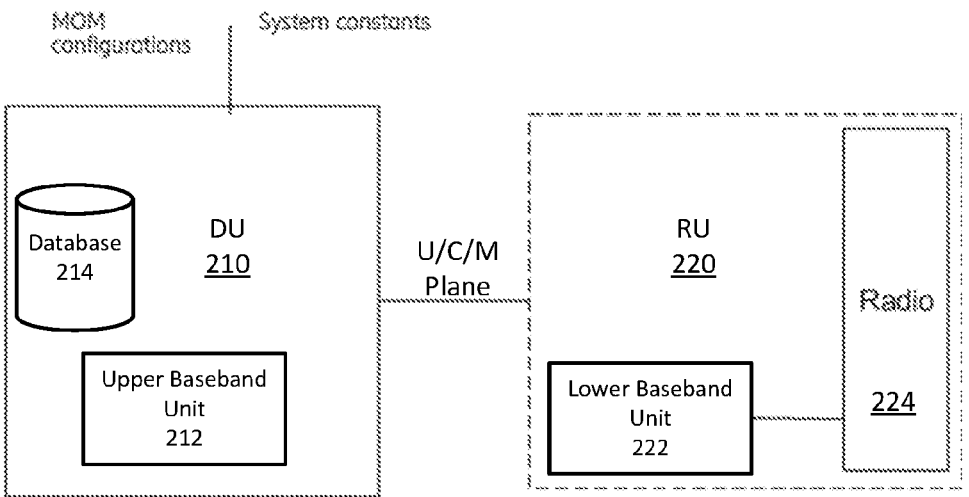
FIGS. 12, 13 and 14 are block diagrams of distributed units and radio units in a radio base station having a lower layer split architecture in accordance with some embodiments.

An arrangement including a DU 210 and an RU 220 according to some embodiments is illustrated in FIG. 12. In this arrangement, the DU 210 incudes a database 212 that stores configurations and system constants for use in power control. The DU 210 includes an upper baseband unit 212, and the RU includes a lower baseband unit 222 and a radio 224.

The arrangement shown in Figure B may not support third-party radio units, as it relies on hardcoded values that are available in the DU for a specific RU. An exception for supporting a third party RU is when there is an agreement between the DU and RU vendors that RU vendor would provide the required parameters to the DU vendor.

In the embodiments illustrated in FIG. 12, first, the RU 220 performs handshaking with the DU 210 to send its ID and other necessary information to the DU 210. If available, the RU 220 can provide the parameter $G_{subarrayAndElement,max}$ to the DU 210 in a radio capability message.

The DU 210 then determines if the RU 220 is a compatible unit (i.e., an RU 210 of a vendor that supports power adjustment for the EIRP limit feature described herein). If so, the value of $G_{p2a,max}$ is extracted from the database/table for the configured CSI-RSs. If $G_{subarrayAndElement,max}$ is not available in a radio capability message from the RU 220, it can be extracted from the database 214.

Next, the upper baseband unit 212 calculates the adaptive power backoff needed on downlink channels using the algorithms/configurations described above. The PDSCH link adaptation (LA) algorithm updates are applied based on the calculated power backoff as described above. The PDCCH LA algorithm updates are applied based on the calculated power backoff values of PDSCH and PDCCH channels as described above, and an update to the calculation of the UE's powerControlOffset (in IE NZP-CSI-RS-Resource) due to PDSCH power backoff is applied as described above. Finally, an update to the calculation of ss-PBCH-BlockPower that is broadcast to the UE is applied.

For some compression techniques, the power backoff value results in an update to the scaling factor in the c-plane that reflects the power of each data section of the u-plane in both CAT-A and CAT-B. For other compression techniques or no compression, the power backoff can be applied directly to modulated symbols in both CAT-A and CAT-B.

Figure 13:
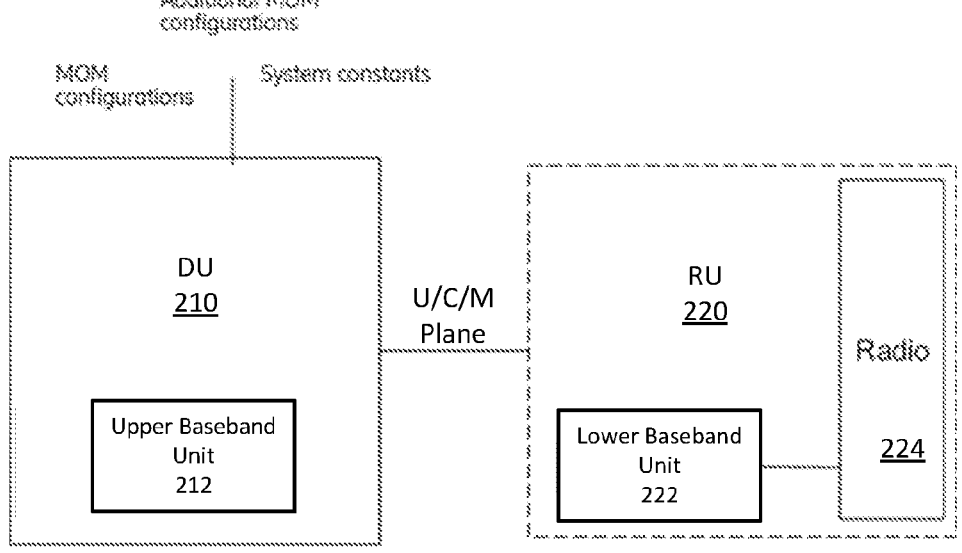

A second embodiment is illustrated in FIG. 13. The arrangement shown in FIG. 13 may more easily support third party radio units, as it relies on receiving radio-dependent parameters via a configuration framework of the DU.

In the embodiments illustrated in FIG. 13, the DU 210 receives the parameter $G_{subarrayAndElement,max}$ of the radio unit 220 and $G_{p2a,max}$ corresponding to the configured CSI-RSs via MOM configurations from other network elements.

Next, the upper baseband unit 212 calculates the adaptive power backoff needed on downlink channels using the algorithms/configurations described above. The PDSCH link adaptation (LA) algorithm updates are applied based on the calculated power backoff as described above. The PDCCH LA algorithm updates are applied based on the calculated power backoff values of PDSCH and PDCCH channels as described above, and an update to the calculation of the UE's powerControlOffset (in IE NZP-CSI-RS-Resource) due to PDSCH power backoff is applied as described above. Finally, an update to the calculation of ss-PBCH-BlockPower that is broadcast to the UE is applied.

For some compression techniques, the power backoff value results in an update to the scaling factor in the c-plane that reflects the power of each data section of the u-plane in both CAT-A and CAT-B. For other compression techniques or no compression, the power backoff can be applied directly to modulated symbols in both CAT-A and CAT-B.

Figure 14:
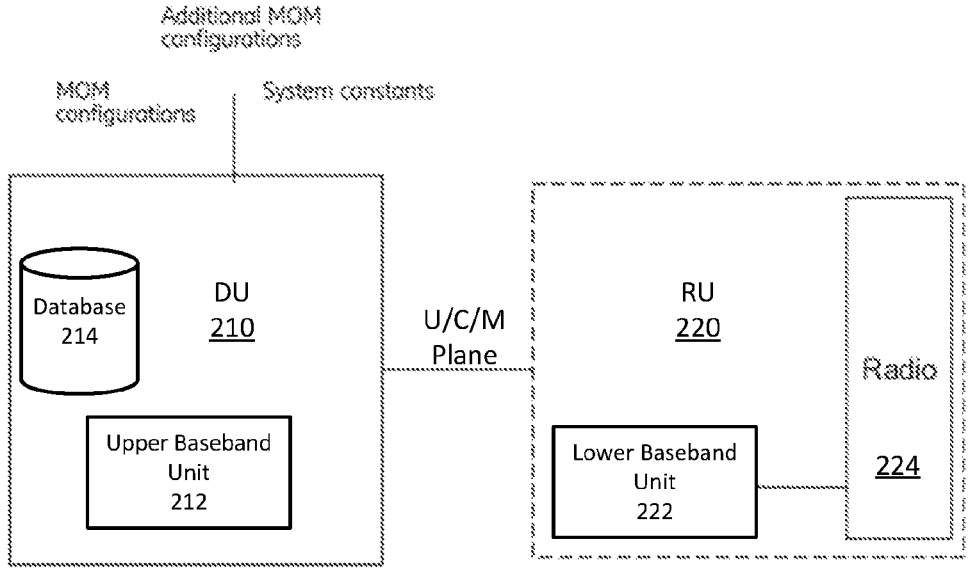

A third embodiment is illustrated in FIG. 14 that provides a combined database/configuration approach. This embodiment may also more easily support third party radio units, as it relies on hardcoded values that are available in DU for known radios and configurable inputs for 3pp radios.

In this embodiment, the RU 220 performs handshaking with the DU 210 to send its ID and other necessary information.

The DU 210 then determines if the RU 220 is a compatible unit (i.e., an RU 210 of a vendor that supports power adjustment for the EIRP limit feature described herein). If so, the values of $G_{subarrayAndElement,max}$ of the RU 220 and $G_{p2a,max}$ for configured CSI-RSs are extracted from the database/table 214. If values of $G_{subarrayAndElement,max}$ and $G_{p2a,max}$ of the RU 220 are not registered in the database 214, the DU 210 receives $G_{subarrayAndElement,max}$ of the RU 220 and $G_{p2a,max}$ corresponding to the configured CSI-RSs via MOM configurations.

or no compression, the power backoff can be applied directly to modulated symbols in both CAT-A and CAT-B.

Figure 15:
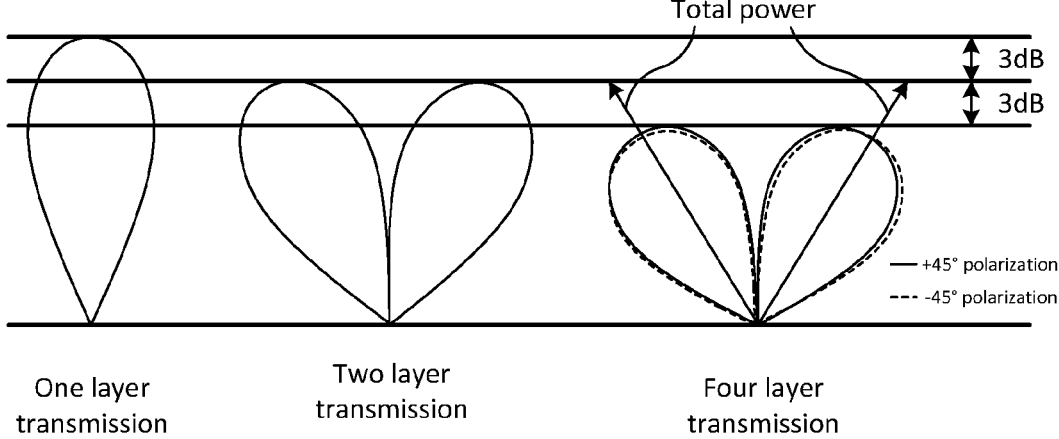
FIG. 15 is a graph illustrating transmission patterns of one, two and four layer transmissions.

Still referring to FIG. 14, a further embodiment uses a maximum backoff value for single layer transmission as a configurable input. Conceptual examples of EIRP patterns for one, two and four layer transmission using 3GPP codebooks are shown in FIG. 15. As can be seen therein, when 2 or 4 layer transmission is employed, the EIRP will be smaller than when there is 1 layer transmission. If it is assumed that there is constraint on EIRP at level A shown in FIG. 15, in this example, a 6 dB power reduction is needed for 1 layer transmission to comply with the EIRP requirement, while for 2 and 4 layer transmissions only a 3 dB power backoff is required.

This embodiment may also more easily support third party radio units, as it relies on receiving a maximum power backoff needed for a single UE for the RU 220 instead of maxEirpPsdThresh. In this case, the DU 210 does not need to have values of $G_{subarrayAndElement,max}$, and $G_{p2a,max}$.

In this embodiment, the DU 210 receives a value of eirpBackoff1Layer corresponding to the configured CSI-RSs via MOM configurations. The DU may convert the value of eirpBackoff1Layer to the unit of decibels if needed.

For some compression techniques, power backoff value results in update to the scaling factor in c-plane that reflects the power of each data section of u-plane in both CAT-A and CAT-B. For other compression techniques or no compression, we can apply power backoff directly to modulated symbols in both CAT-A and CAT-B.

The modified algorithm for SU-MIMO is as follows:

```
For each UE:
  If (number of transmission layers is one) or (number of transmission layers is greater
  than one and two layers are transmitted on the same directions but different
  polarizations):
      GlayerSplit=10log10(1/nrofLayers)
  else
      GlayerSplit=10log10(2/nrofLayers)
  End
  pdschEirpBackoffInDb=max(0, eirpBackoff1Layer −GlayerSplit ).
  Update ICC and SINR calculation of SU-MIMO PDSCH link adaptation based on the
  calculated backoff value.
  pdschEirpBackoffLinear=10^((−pdschEirpBackoffInDb)/20)
  Multiply pdschEirpBackoffLinear with amplitude of the transmit signal
End
```

Next, the upper baseband unit 212 calculates the adaptive power backoff needed on downlink channels using the algorithms/configurations described above. The PDSCH link adaptation (LA) algorithm updates are applied based on the calculated power backoff as described above. The PDCCH LA algorithm updates are applied based on the calculated power backoff values of PDSCH and PDCCH channels as described above, and an update to the calculation of the UE's powerControlOffset (in IE NZP-CSI-RS-Resource) due to PDSCH power backoff is applied as described above. Finally, an update to the calculation of ss-PBCH-BlockPower that is broadcast to the UE is applied.

For some compression techniques, power backoff value results in update to the scaling factor in c-plane that reflects the power of each data section of u-plane in both CAT-A and CAT-B. For other compression techniques or no compression, we can apply power backoff directly to modulated symbols in both CAT-A and CAT-B.

For some compression techniques, the power backoff value results in an update to the scaling factor in the c-plane that reflects the power of each data section of the u-plane in both CAT-A and CAT-B. For other compression techniques The modified algorithm for MU-MIMO and RAT is as follows:

For each UE:

```
gMU is provided
For each PRB or RBG or group of RBs:
    nrofTotalLayers is provided, where it is the total number of layers of
    all UEs that are co-scheduled for MU transmission in this RBG;
    If (number of transmission layers of the UE in this RBG is one) or
    (number of transmission layers of the UE in this RBG is greater than
    one and two layers are transmitted on the same directions but
    different polarizations):
        GlayerSplit=10log10(1/nrofTotalLayers)
    else
        GlayerSplit=10log10(2/nrofTotalLayers)
    End
    If MU-MIMO
        Gmu=gMU
    else
        Gmu=0
    End
    pdschEirpBackoffInDb=max(0, eirpBackoff1Layer −GlayerSplit−Gmu ).
    Update ICC and SINR calculation of SU or MU-MIMO PDSCH link
    adaptation based on the calculated backoff value.
```

23

-continued

```
pdschEirpBackoffLinear=10^((-pdschEirpBackoffInDb)/20)
Multiply pdschEirpBackoffLinear with amplitude of the transmit
    signal
End
End
```

Figure 16:
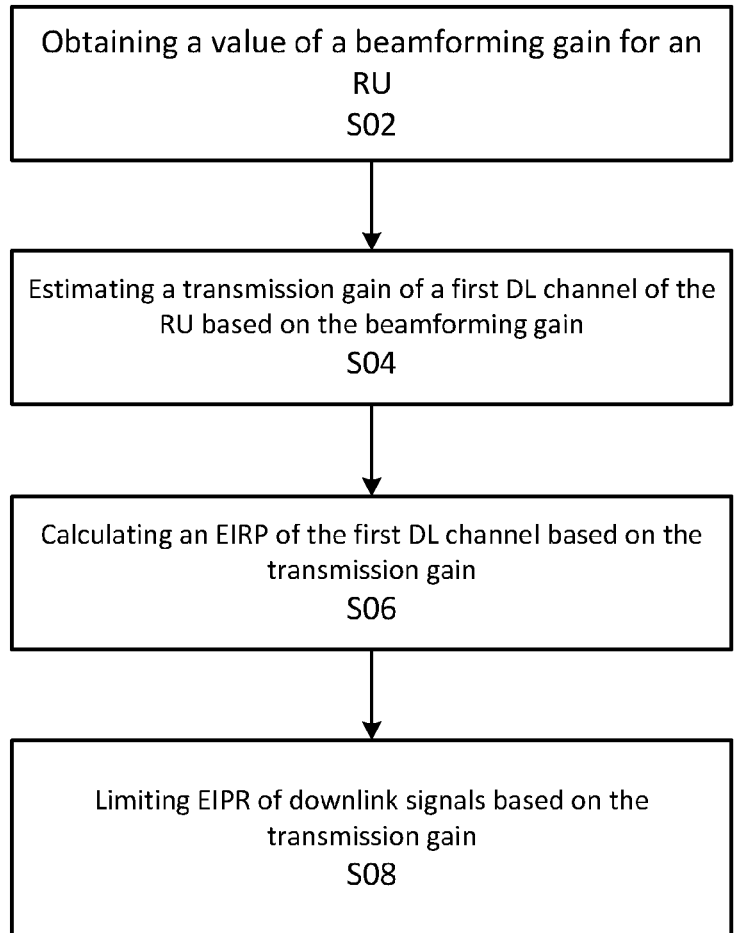
FIGS. 16 and 17 are flowcharts that illustrate operations of a radio base station having a lower layer split architecture according to some embodiments.

FIG. 16 is a flowchart that illustrates a method of operating a distributed unit, DU, of a radio network node in a wireless communication system according to some embodiments. The method includes obtaining (block S02) a value of a beamforming gain, $G_{subarrayAndElement}$, for a radio unit, RU, connected to the DU, estimating (block S04) a transmission gain associated with a first downlink channel of the RU based on the beamforming gain, and calculating (block S06) an effective isotropically radiated power, EIRP, level for the first downlink channel based on the estimated transmission gain of the first channel. The method further includes adaptively limiting (block S08) EIRP of downlink signals transmitted by the RU on the first downlink channel based on the transmission gain.

In some embodiments, the estimated transmission gain of the first channel is based on a number of multiple input multiple output, MIMO, layers transmitted on the first channel.

In some embodiments, the method includes obtaining a port-to-antenna mapping gain, $G_{p2a}$, of the RU, wherein the estimated transmission gain of the first downlink channel is based on the port-to-antenna mapping gain, $G_{p2a}$, of the RU. The estimated transmission gain of the first channel may be based on one or more of a precoding gain, $G_{precoding}$, a tuning gain, $G_{tuning}$, and a boost gain, $G_{boost}$.

In some embodiments, the method includes receiving the beamforming gain from the RU. In some embodiments, the method includes receiving the beamforming gain from a local database in the DU. In some embodiments, the method includes receiving the beamforming gain in a network configuration.

The method may include obtaining the port-to-antenna mapping gain, $G_{p2a}$, of the RU from a local database in the DU.

Adaptively limiting the EIRP of downlink signals transmitted by the RU on the first downlink channel may include obtaining a power backoff value based on the transmission gain.

The method may further include generating a scaling factor based on the power backoff value, and transmitting the scaling factor to the RU.

The method may further include generating a scaling factor based on the power backoff value, applying the scaling factor to modulated data symbols, and transmitting the modulated data symbols to the RU for transmission.

The estimated transmission gain of the first channel may be based on a number of multiple input multiple output, MIMO, layers transmitted on the first channel.

In some embodiments, the estimated transmission gain of the first channel may be based on one or more of a precoding gain, $G_{precoding}$, a port-to-antenna mapping gain, $G_{p2a}$, a beamforming gain, $G_{subarrayAndElement}$, a tuning gain, $G_{tuning}$, and a boost gain, $G_{boost}$.

The first channel may be a physical downlink shared channel associated with a wireless device, and the estimated transmission gain of the first channel, $G_{pdsch}$, may be calculated as:

$$G_{pdsch} = G_{precoding} + G_{p2a} + G_{subarrayAndElement} + G_{tuning} + G_{layersplit} + G_{boost}$$

where $G_{layersplit}$ represents a gain associated with a number of MIMO layers transmitted on the first channel.

The EIRP level for the first channel may be calculated as a sum of the transmission gain and the transmission power of the first channel.

The EIRP level for the first channel may be calculated as:

$$EIRP_{pdsch} = G_{pdsch} + TXPower$$

where TXPower represents the transmission power on the first channel.

The method may further include calculating an EIRP backoff as:

$$pdschEirpBackoff = max(0, EIRP_{pdsch} - maxEirpTh)$$

where maxEirpTh is a maximum EIRP threshold.

The method may further include adjusting a power of a signal transmitted on the first channel based on the EIRP backoff.

The method may further include determining if multiuser-MIMO is being used, and in response to determining that multi-user MIMO is being used, calculating the transmission gain of the first channel based in part on a multiuser MIMO gain, $G_{mu}$.

The first channel may be a single user MIMO channel, and the estimated transmission gain of the first channel, $G_{pdsch}$, may be based on a reciprocity precoder gain, $G_{rar}$, that represents both a precoder gain and a port-to-antenna mapping gain.

Figure 17:
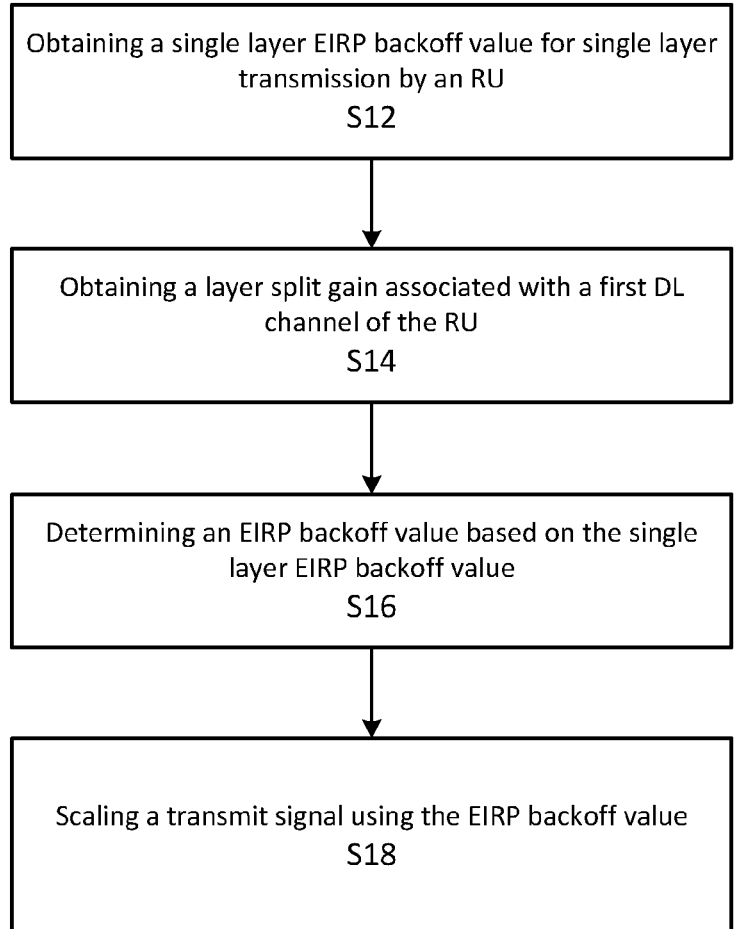
Figure 18:
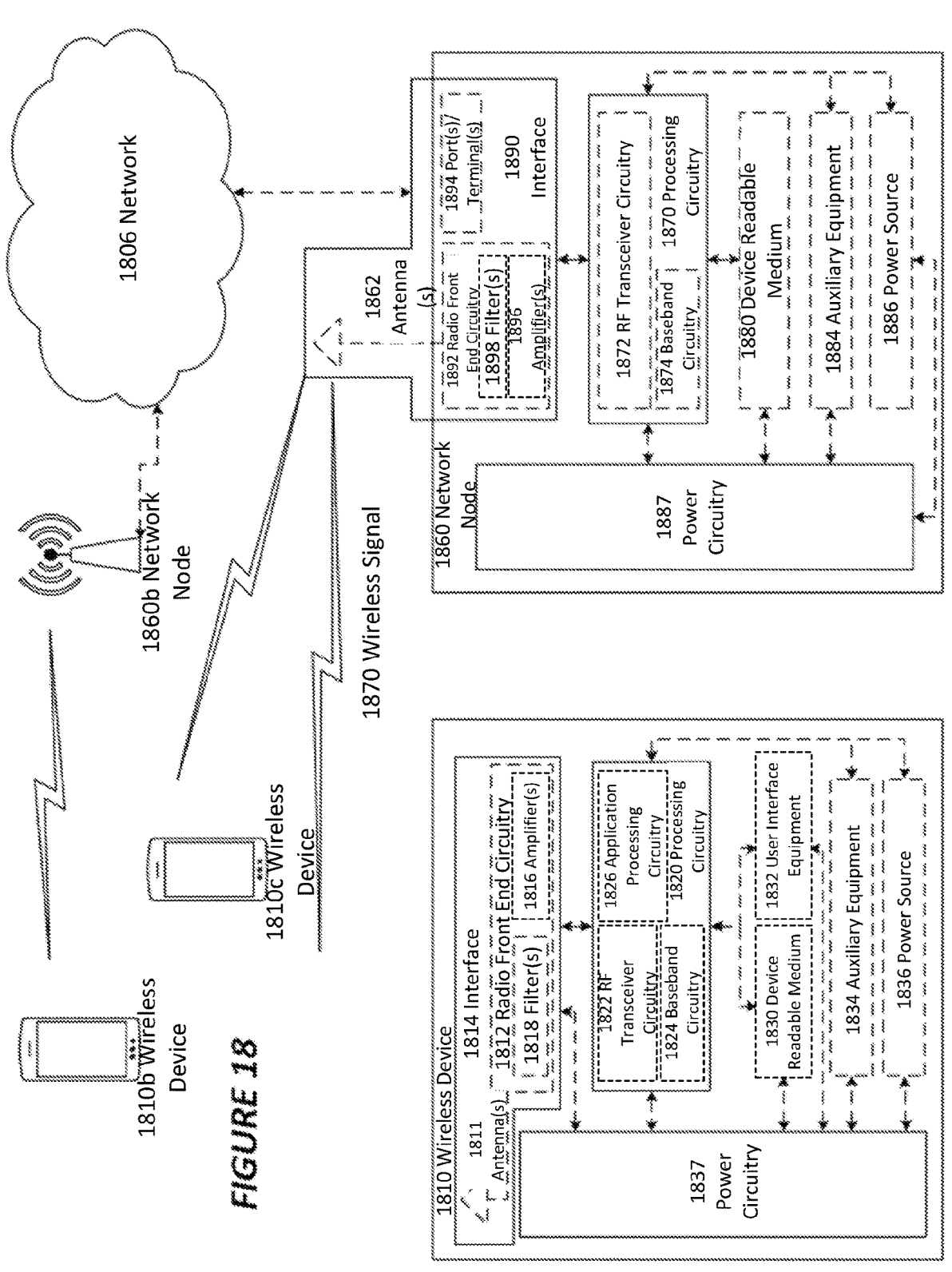
FIG. 18 is a block diagram of a wireless network in accordance with some embodiments.
Figure 19:
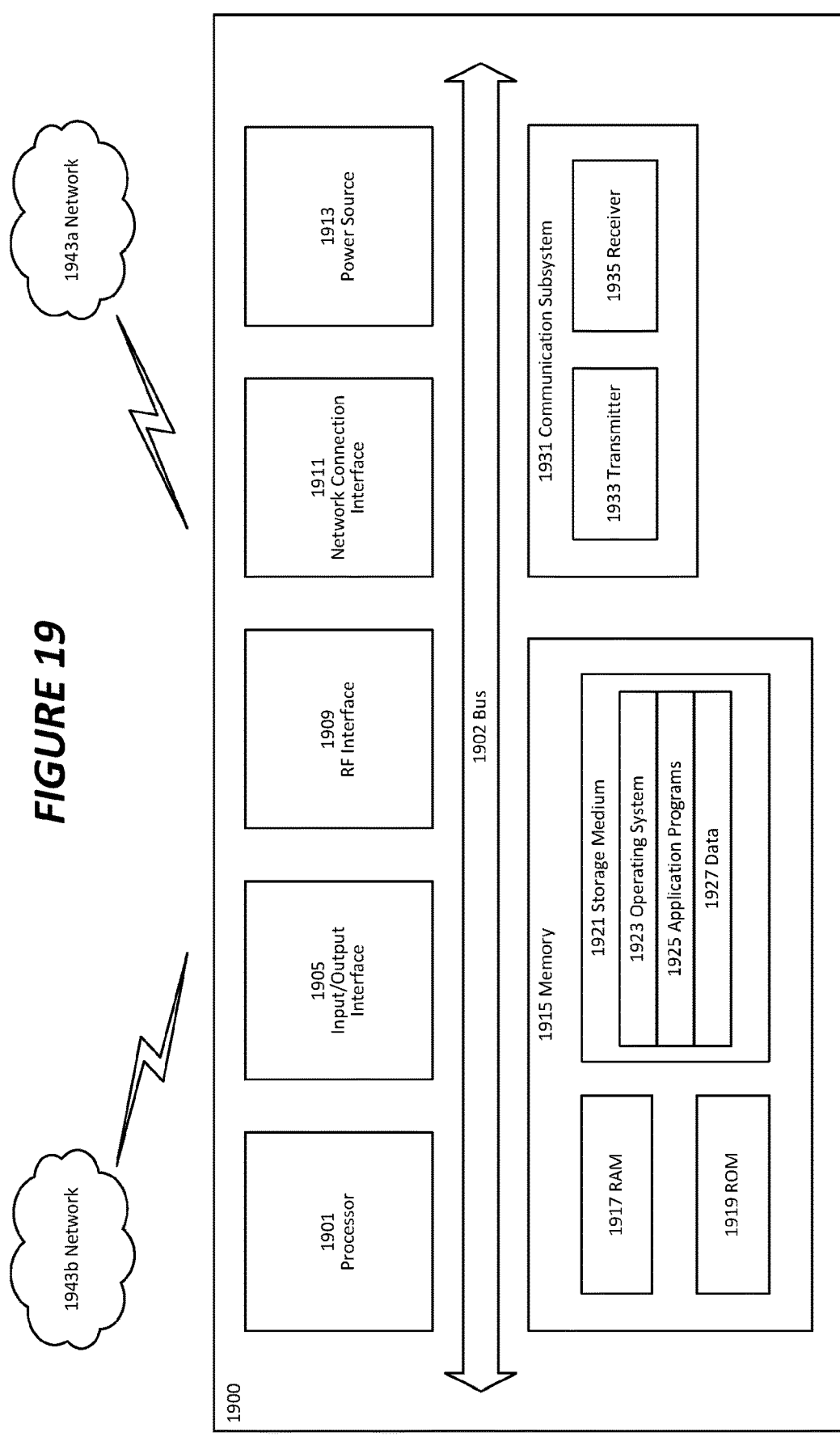
FIG. 19 is a block diagram of a user equipment in accordance with some embodiments

FIG. 17 is a flowchart that illustrates a method of operating a distributed unit, DU, of a radio network node in a wireless communication system. The method includes obtaining (block S12) a value of single layer effective isotropic radiated power, EIRP, backoff, eirpBackoff1Layer, for single layer transmission by a radio unit, RU, connected to the DU, obtaining (block S14) a layer split gain, $G_{layerSplit}$, associated with a first downlink transmission channel of the RU, and determining (block S16) an EIRP backoff value based on the single layer EIRP backoff value and the layer split gain. The method further includes scaling (block S18) a transmit signal using the EIRP backoff value.

The EIRP backoff value may be an EIRP backoff value for a downlink shared channel of the RU.

The EIRP backoff value, pdschEirpBackoffInDb, may be calculated as:

$$pdschEirpBackoffInDb = max(0, eirpBackoff1Layer - G_{layersplit}).$$

The EIRP backoff value may be determined based on a multi-user gain $G_{mu}$. and the EIRP backoff value, pdschEirpBackoffInDb, may be calculated as:

$$pdschEirpBackoffInDb = max(0, eirpBackoff1Layer - G_{layersplit} - G_{mu}).$$

Explanations are provided below for abbreviations that are mentioned in the present disclosure.

| Abbreviation | Explanation |
| --- | --- |
| AAS | active antenna system |
| BF | beamforming |
| BFG | beamforming gain |
| BFW | beamforming weight |
| CPRI | common public radio interface |
| CQI | channel quality indicator |
| CRI | CSI-RS resource indicator |
| CSI | channel state information |
| CSI-RS | CSI reference signal |
| DL | downlink |
| DMRS | demodulation reference signal |
| eCPRI | enhanced CPRI |
| EIRP | effective isotropically radiated power |
| EMF | electromagnetic force |
| ICC | information carrying capacity |
| ICNIRP | International Commission on Non-Ionizing Radiation Protection |
| IE | information element |
| LA | link adaptation |
| LTE | long term evolution |
| MIMO | multiple input multiple output |
| mMIMO | massive MIMO |
| MOM | managed object model |
| MU | multiuser |
| MU-MIMO | multiuser MIMO |
| NR | new radio |
| PBCH | physical broadcast channel |
| PDCCH | physical downlink control channel |
| PDSCH | physical downlink shared channel |
| PMI | precoding matric indicator |
| PSS | primary synchronization signal |
| RAT | reciprocity assisted transmission |
| RB | resource block |
| RBS | radio base station |
| RF | radio frequency |
| RI | rank indicator |
| SINR | signal to interference and noise ratio |
| SSB | synchronization signal block |
| SSS | secondary synchronization signal |
| SU | single user |
| SU-MIMO | single user MIMO |
| TRS | tracking reference signal |
| UE | user equipment |
| WHO | world health organization |

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 25:
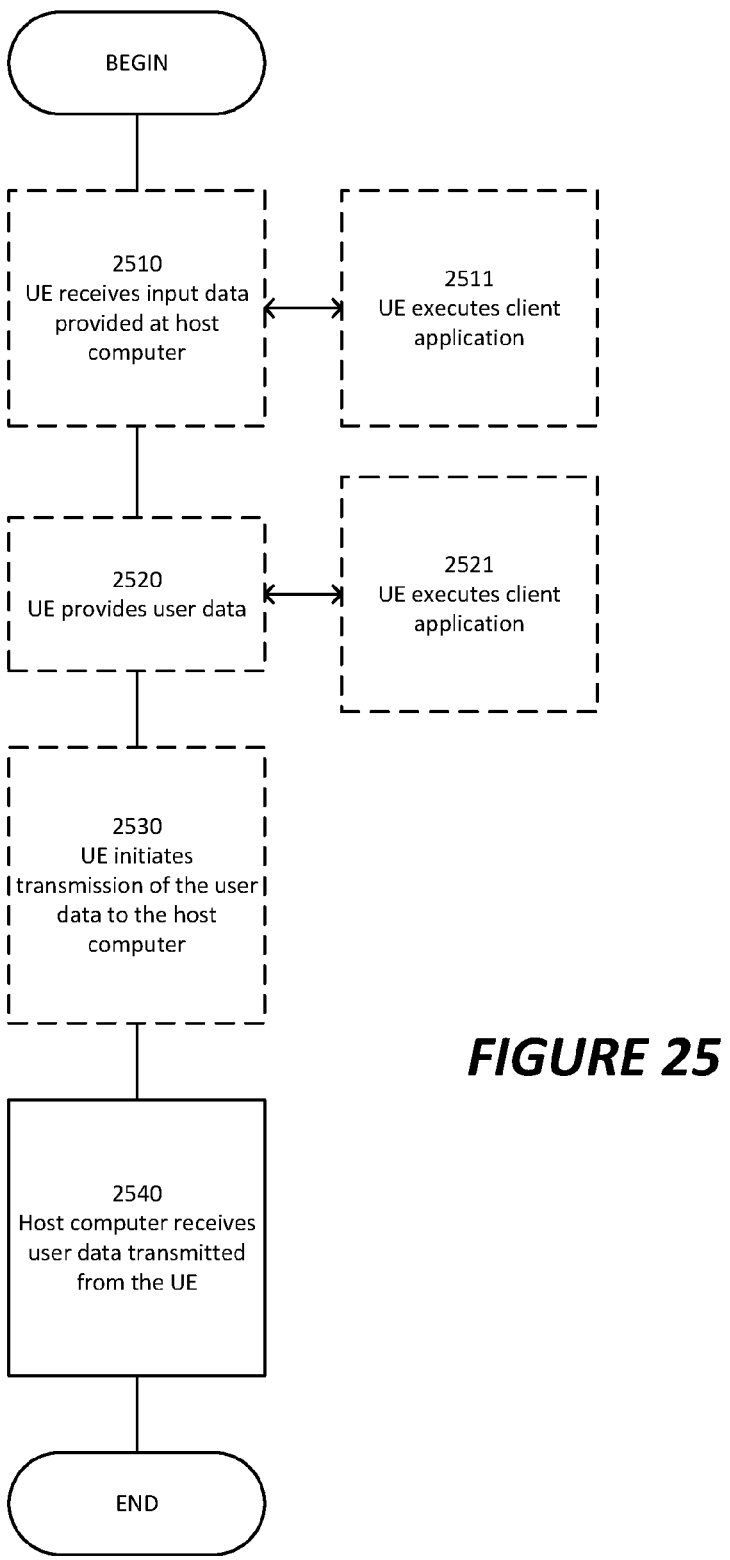
FIG. 25 is a block diagram of methods implemented in a communication system including a host computer, a base station, and a user equipment in accordance with some embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. FIG. 25: a Wireless Network in Accordance with Some Embodiments.

Although the subject matter described herein may be implemented in any appropriate type of system using any suitable components, the embodiments disclosed herein are described in relation to a wireless network, such as the example wireless network illustrated in FIG. 25. For simplicity, the wireless network of FIG. 25 only depicts network 1806, network nodes 1860 and 1860b, and WDs 1810, 1810b, and 1810c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 1860 and wireless device (WD) 1810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1860 and WD 1810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 25, network node 1860 includes processing circuitry 1870, device readable medium 1880, interface 1890, auxiliary equipment 1884, power source 1886, power circuitry 1887, and antenna 1862. Although network node 1860 illustrated in the example wireless network of FIG. 25 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1860 are depicted as single boxes located within a larger box, or nested within multiple boxes, in practice, a network node may comprise multiple different physical components that make up a single illustrated component (e.g., device readable medium 1880 may comprise multiple separate hard drives as well as multiple RAM modules).

Similarly, network node 1860 may be composed of multiple physically separate components (e.g., a NodeB component and a RNC component, or a BTS component and a BSC component, etc.), which may each have their own respective components. In certain scenarios in which network node 1860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1860 may be configured to support multiple radio access technologies (RATs). In such embodiments, some components may be duplicated (e.g., separate device readable medium 1880 for the different RATs) and some components may be reused (e.g., the same antenna 1862 may be shared by the RATs). Network node 1860 may also include multiple sets of the various illustrated components for different wireless technologies integrated into network node 1860, such as, for example, GSM, WCDMA, LTE, NR, WiFi, or Bluetooth wireless technologies. These wireless technologies may be integrated into the same or different chip or set of chips and other components within network node 1860.

Processing circuitry 1870 is configured to perform any determining, calculating, or similar operations (e.g., certain obtaining operations) described herein as being provided by a network node. These operations performed by processing circuitry 1870 may include processing information obtained by processing circuitry 1870 by, for example, converting the obtained information into other information, comparing the obtained information or converted information to information stored in the network node, and/or performing one or more operations based on the obtained information or converted information, and as a result of said processing making a determination.

Processing circuitry 1870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1860 components, such as device readable medium 1880, network node 1860 functionality. For example, processing circuitry 1870 may execute instructions stored in device readable medium 1880 or in memory within processing circuitry 1870. Such functionality may include providing any of the various wireless features, functions, or benefits discussed herein. In some embodiments, processing circuitry 1870 may include a system on a chip (SOC).

In some embodiments, processing circuitry 1870 may include one or more of radio frequency (RF) transceiver circuitry 1872 and baseband processing circuitry 1874. In some embodiments, radio frequency (RF) transceiver circuitry 1872 and baseband processing circuitry 1874 may be on separate chips (or sets of chips), boards, or units, such as radio units and digital units. In alternative embodiments, part or all of RF transceiver circuitry 1872 and baseband processing circuitry 1874 may be on the same chip or set of chips, boards, or units.

In certain embodiments, some or all of the functionality described herein as being provided by a network node, base station, eNB or other such network device may be performed by processing circuitry 1870 executing instructions stored on device readable medium 1880 or memory within processing circuitry 1870. In alternative embodiments, some or all of the functionality may be provided by processing circuitry 1870 without executing instructions stored on a separate or discrete device readable medium, such as in a hard-wired manner. In any of those embodiments, whether executing instructions stored on a device readable storage medium or not, processing circuitry 1870 can be configured to perform the described functionality. The benefits provided by such functionality are not limited to processing circuitry 1870 alone or to other components of network node 1860, but are enjoyed by network node 1860 as a whole, and/or by end users and the wireless network generally.

Device readable medium 1880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1870. Device readable medium 1880 may store any suitable instructions, data or information, including a computer program, software, an application including one or more of logic, rules, code, tables, etc. and/or other instructions capable of being executed by processing circuitry 1870 and, utilized by network node 1860. Device readable medium 1880 may be used to store any calculations made by processing circuitry 1870 and/or any data received via interface 1890. In some embodiments, processing circuitry 1870 and device readable medium 1880 may be considered to be integrated.

Interface 1890 is used in the wired or wireless communication of signalling and/or data between network node 1860, network 1806, and/or WDs 1810. As illustrated, interface 1890 comprises port(s)/terminal(s) 1894 to send and receive data, for example to and from network 1806 over a wired connection. Interface 1890 also includes radio front end circuitry 1892 that may be coupled to, or in certain embodiments a part of, antenna 1862. Radio front end circuitry 1892 comprises filters 1898 and amplifiers 1896. Radio front end circuitry 1892 may be connected to antenna 1862 and processing circuitry 1870. Radio front end circuitry may be configured to condition signals communicated between antenna 1862 and processing circuitry 1870. Radio front end circuitry 1892 may receive digital data that is to be sent out to other network nodes or WDs via a wireless connection. Radio front end circuitry 1892 may convert the digital data into a radio signal having the appropriate channel and bandwidth parameters using a combination of filters 1898 and/or amplifiers 1896. The radio signal may then be transmitted via antenna 1862. Similarly, when receiving data, antenna 1862 may collect radio signals which are then converted into digital data by radio front end circuitry 1892. The digital data may be passed to processing circuitry 1870. In other embodiments, the interface may comprise different components and/or different combinations of components.

In certain alternative embodiments, network node 1860 may not include separate radio front end circuitry 1892, instead, processing circuitry 1870 may comprise radio front end circuitry and may be connected to antenna 1862 without separate radio front end circuitry 1892. Similarly, in some embodiments, all or some of RF transceiver circuitry 1872 may be considered a part of interface 1890. In still other embodiments, interface 1890 may include one or more ports or terminals 1894, radio front end circuitry 1892, and RF transceiver circuitry 1872, as part of a radio unit (not shown), and interface 1890 may communicate with baseband processing circuitry 1874, which is part of a digital unit (not shown).

Antenna 1862 may include one or more antennas, or antenna arrays, configured to send and/or receive wireless signals. Antenna 1862 may be coupled to radio front end circuitry 1890 and may be any type of antenna capable of transmitting and receiving data and/or signals wirelessly. In some embodiments, antenna 1862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1862 may be separate from network node 1860 and may be connectable to network node 1860 through an interface or port.

Antenna 1862, interface 1890, and/or processing circuitry 1870 may be configured to perform any receiving operations and/or certain obtaining operations described herein as being performed by a network node. Any information, data and/or performed by a network node. Any information, data and/or signals may be received from a wireless device, another network node and/or any other network equipment. Similarly, antenna 1862, interface 1890, and/or processing circuitry 1870 may be configured to perform any transmitting operations described herein as being performed by a network node. Any information, data and/or signals may be transmitted to a wireless device, another network node and/or any other network equipment.

Power circuitry 1887 may comprise, or be coupled to, power management circuitry and is configured to supply the components of network node 1860 with power for performing the functionality described herein. Power circuitry 1887 may receive power from power source 1886. Power source 1886 and/or power circuitry 1887 may be configured to provide power to the various components of network node 1860 in a form suitable for the respective components (e.g., at a voltage and current level needed for each respective component). Power source 1886 may either be included in, or external to, power circuitry 1887 and/or network node 1860. For example, network node 1860 may be connectable to an external power source (e.g., an electricity outlet) via an input circuitry or interface such as an electrical cable, whereby the external power source supplies power to power circuitry 1887. As a further example, power source 1886 may comprise a source of power in the form of a battery or battery pack which is connected to, or integrated in, power circuitry 1887. The battery may provide backup power should the external power source fail. Other types of power sources, such as photovoltaic devices, may also be used.

Alternative embodiments of network node 1860 may include additional components beyond those shown in FIG. 25 that may be responsible for providing certain aspects of the network node's functionality, including any of the functionality described herein and/or any functionality necessary to support the subject matter described herein. For example, network node 1860 may include user interface equipment to allow input of information into network node 1860 and to allow output of information from network node 1860. This may allow a user to perform diagnostic, maintenance, repair, and other administrative functions for network node 1860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicleto-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1810 includes antenna 1811, interface 1814, processing circuitry 1820, device readable medium 1830, user interface equipment 1832, auxiliary equipment 1834, power source 1836 and power circuitry 1837. WD 1810 may include multiple sets of one or more of the illustrated components for different wireless technologies supported by WD 1810, such as, for example, GSM, WCDMA, LTE, NR, WiFi, WiMAX, or Bluetooth wireless technologies, just to mention a few. These wireless technologies may be integrated into the same or different chips or set of chips as other components within WD 1810.

Antenna 1811 may include one or more antennas or antenna arrays, configured to send and/or receive wireless signals, and is connected to interface 1814. In certain alternative embodiments, antenna 1811 may be separate from WD 1810 and be connectable to WD 1810 through an interface or port. Antenna 1811, interface 1814, and/or processing circuitry 1820 may be configured to perform any receiving or transmitting operations described herein as being performed by a WD. Any information, data and/or signals may be received from a network node and/or another WD. In some embodiments, radio front end circuitry and/or antenna 1811 may be considered an interface.

As illustrated, interface 1814 comprises radio front end circuitry 1812 and antenna 1811. Radio front end circuitry 1812 comprise one or more filters 1818 and amplifiers 1816. Radio front end circuitry 1814 is connected to antenna 1811 and processing circuitry 1820, and is configured to condition signals communicated between antenna 1811 and processing circuitry 1820. Radio front end circuitry 1812 may be coupled to or a part of antenna 1811. In some embodiments, WD 1810 may not include separate radio front end circuitry 1812; rather, processing circuitry 1820 may comprise radio front end circuitry and may be connected to antenna 1811. Similarly, in some embodiments, some or all of RF transceiver circuitry 1822 may be considered a part of interface 1814. Radio front end circuitry 1812 may receive digital data that is to be sent out to other network nodes or WDs via a wireless connection. Radio front end circuitry 1812 may convert the digital data into a radio signal having the appropriate channel and bandwidth parameters using a combination of filters 1818 and/or amplifiers 1816. The radio signal may then be transmitted via antenna 1811. Similarly, when receiving data, antenna 1811 may collect radio signals which are then converted into digital data by radio front end circuitry 1812. The digital data may be passed to processing circuitry 1820. In other embodiments, the interface may comprise different components and/or different combinations of components.

Processing circuitry 1820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1810 components, such as device readable medium 1830, WD 1810 functionality. Such functionality may include providing any of the various wireless features or benefits discussed herein. For example, processing circuitry 1820 may execute instructions stored in device readable medium 1830 or in memory within processing circuitry 1820 to provide the functionality disclosed herein.

As illustrated, processing circuitry 1820 includes one or more of RF transceiver circuitry 1822, baseband processing circuitry 1824, and application processing circuitry 1826. In other embodiments, the processing circuitry may comprise different components and/or different combinations of components. In certain embodiments processing circuitry 1820 of WD 1810 may comprise a SOC. In some embodiments, RF transceiver circuitry 1822, baseband processing circuitry 1824, and application processing circuitry 1826 may be on separate chips or sets of chips. In alternative embodiments, part or all of baseband processing circuitry 1824 and application processing circuitry 1826 may be combined into one chip or set of chips, and RF transceiver circuitry 1822 may be on a separate chip or set of chips. In still alternative embodiments, part or all of RF transceiver circuitry 1822 and baseband processing circuitry 1824 may be on the same chip or set of chips, and application processing circuitry 1826 may be on a separate chip or set of chips. In yet other alternative embodiments, part or all of RF transceiver circuitry 1822, baseband processing circuitry 1824, and application processing circuitry 1826 may be combined in the same chip or set of chips. In some embodiments, RF transceiver circuitry 1822 may be a part of interface 1814. RF transceiver circuitry 1822 may condition RF signals for processing circuitry 1820.

In certain embodiments, some or all of the functionality described herein as being performed by a WD may be provided by processing circuitry 1820 executing instructions stored on device readable medium 1830, which in certain embodiments may be a computer-readable storage medium. In alternative embodiments, some or all of the functionality may be provided by processing circuitry 1820 without executing instructions stored on a separate or discrete device readable storage medium, such as in a hard-wired manner. In any of those particular embodiments, whether executing instructions stored on a device readable storage medium or not, processing circuitry 1820 can be configured to perform the described functionality. The benefits provided by such functionality are not limited to processing circuitry 1820 alone or to other components of WD 1810, but are enjoyed by WD 1810 as a whole, and/or by end users and the wireless network generally.

Processing circuitry 1820 may be configured to perform any determining, calculating, or similar operations (e.g., certain obtaining operations) described herein as being performed by a WD. These operations, as performed by processing circuitry 1820, may include processing information obtained by processing circuitry 1820 by, for example, converting the obtained information into other information, comparing the obtained information or converted information to information stored by WD 1810, and/or performing one or more operations based on the obtained information or converted information, and as a result of said processing making a determination.

Device readable medium 1830 may be operable to store a computer program, software, an application including one or more of logic, rules, code, tables, etc. and/or other instructions capable of being executed by processing circuitry 1820. Device readable medium 1830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1820. In some embodiments, processing circuitry 1820 and device readable medium 1830 may be considered to be integrated. User interface equipment 1832 may provide components that allow for a human user to interact with WD 1810. Such interaction may be of many forms, such as visual, audial, tactile, etc. User interface equipment 1832 may be operable to produce output to the user and to allow the user to provide input to WD 1810. The type of interaction may vary depending on the type of user interface equipment 1832 installed in WD 1810. For example, if WD 1810 is a smart phone, the interaction may be via a touch screen; if WD 1810 is a smart meter, the interaction may be through a screen that provides usage (e.g., the number of gallons used) or a speaker that provides an audible alert (e.g., if smoke is detected). User interface equipment 1832 may include input interfaces, devices and circuits, and output interfaces, devices and circuits. User interface equipment 1832 is configured to allow input of information into WD 1810, and is connected to processing circuitry 1820 to allow processing circuitry 1820 to process the input information. User interface equipment 1832 may include, for example, a microphone, a proximity or other sensor, keys/buttons, a touch display, one or more cameras, a USB port, or other input circuitry. User interface equipment 1832 is also configured to allow output of information from WD 1810, and to allow processing circuitry 1820 to output information from WD 1810. User interface equipment 1832 may include, for example, a speaker, a display, vibrating circuitry, a USB port, a headphone interface, or other output circuitry. Using one or more input and output interfaces, devices, and circuits, of user interface equipment 1832, WD 1810 may communicate with end users and/or the wireless network, and allow them to benefit from the functionality described herein.

Auxiliary equipment 1834 is operable to provide more specific functionality which may not be generally performed by WDs. This may comprise specialized sensors for doing measurements for various purposes, interfaces for additional types of communication such as wired communications etc. The inclusion and type of components of auxiliary equipment 1834 may vary depending on the embodiment and/or scenario.

Power source 1836 may, in some embodiments, be in the form of a battery or battery pack. Other types of power sources, such as an external power source (e.g., an electricity outlet), photovoltaic devices or power cells, may also be used. WD 1810 may further comprise power circuitry 1837 for delivering power from power source 1836 to the various parts of WD 1810 which need power from power source 1836 to carry out any functionality described or indicated herein. Power circuitry 1837 may in certain embodiments comprise power management circuitry. Power circuitry 1837 may additionally or alternatively be operable to receive power from an external power source; in which case WD 1810 may be connectable to the external power source (such as an electricity outlet) via input circuitry or an interface such as an electrical power cable. Power circuitry 1837 may also in certain embodiments be operable to deliver power from an external power source to power source 1836. This may be, for example, for the charging of power source 1836. Power circuitry 1837 may perform any formatting, converting, or other modification to the power from power source 1836 to make the power suitable for the respective components of WD 1810 to which power is supplied.

Figure 26:
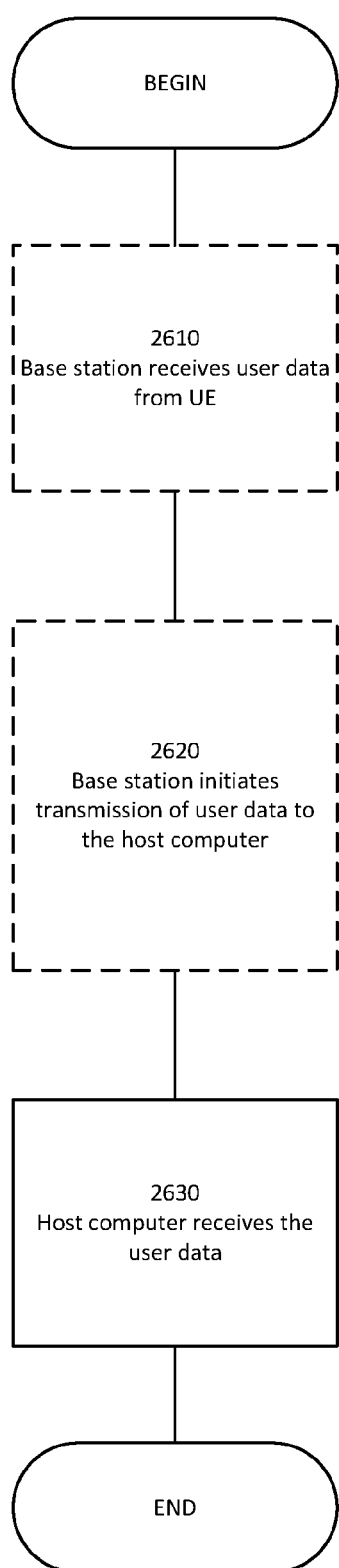
FIG. 26 is a block diagram of methods implemented in a communication system including a host computer, a base station, and a user equipment in accordance with some embodiments.

FIG. 26: User Equipment in Accordance with Some Embodiments

FIG. 26 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 19200 may be any UE identified by the 3rd Generation Partnership Project (3GPP), including a NB-IoT UE, a machine type communication (MTC) UE, and/or an enhanced MTC (eMTC) UE. UE 1900, as illustrated in FIG. 26, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 26 is a UE, the components discussed herein are equally applicable to a WD, and vice-versa.

In FIG. 26, UE 1900 includes processing circuitry 1901 that is operatively coupled to input/output interface 1905, radio frequency (RF) interface 1909, network connection interface 1911, memory 1915 including random access memory (RAM) 1917, read-only memory (ROM) 1919, and storage medium 1921 or the like, communication subsystem 1931, power source 1933, and/or any other component, or any combination thereof. Storage medium 1921 includes operating system 1923, application program 1925, and data 1927. In other embodiments, storage medium 1921 may include other similar types of information. Certain UEs may utilize all of the components shown in FIG. 26, or only a subset of the components. The level of integration between the components may vary from one UE to another UE. Further, certain UEs may contain multiple instances of a component, such as multiple processors, memories, transceivers, transmitters, receivers, etc.

In FIG. 26, processing circuitry 1901 may be configured to process computer instructions and data. Processing circuitry 1901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1901 may include two central processing units (CPUs). Data may be information in a form suitable for use by a computer.

In the depicted embodiment, input/output interface 1905 may be configured to provide a communication interface to an input device, output device, or input and output device. UE 1900 may be configured to use an output device via input/output interface 1905. An output device may use the same type of interface port as an input device. For example, a USB port may be used to provide input to and output from UE 1900. The output device may be a speaker, a sound card, a video card, a display, a monitor, a printer, an actuator, an emitter, a smartcard, another output device, or any combination thereof. UE 1900 may be configured to use an input device via input/output interface 1905 to allow a user to capture information into UE 1900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 26, RF interface 1909 may be configured to provide a communication interface to RF components such as a transmitter, a receiver, and an antenna. Network connection interface 1911 may be configured to provide a communication interface to network 1943a. Network 1943a may encompass wired and/or wireless networks such as a local-area network (LAN), a wide-area network (WAN), a computer network, a wireless network, a telecommunications network, another like network or any combination thereof. For example, network 1943a may comprise a Wi-Fi network. Network connection interface 1911 may be configured to include a receiver and a transmitter interface used to communicate with one or more other devices over a communication network according to one or more communication protocols, such as Ethernet, TCP/IP, SONET, ATM, or the like. Network connection interface 1911 may implement receiver and transmitter functionality appropriate to the communication network links (e.g., optical, electrical, and the like). The transmitter and receiver functions may share circuit components, software or firmware, or alternatively may be implemented separately.

RAM 1917 may be configured to interface via bus 1902 to processing circuitry 1901 to provide storage or caching of data or computer instructions during the execution of software programs such as the operating system, application programs, and device drivers. ROM 1919 may be configured to provide computer instructions or data to processing circuitry 1901. For example, ROM 1919 may be configured to store invariant low-level system code or data for basic system functions such as basic input and output (I/O), startup, or reception of keystrokes from a keyboard that are stored in a non-volatile memory. Storage medium 1921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1921 may be configured to include operating system 1923, application program 1925 such as a web browser application, a widget or gadget engine or another application, and data file 1927. Storage medium 1921 may store, for use by UE 1900, any of a variety of various operating systems or combinations of operating systems.

Storage medium 1921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1921 may allow UE 1900 to access computer-executable instructions, application programs or the like, stored on transitory or non-transitory memory media, to off-load data, or to upload data. An article of manufacture, such as one utilizing a communication system may be tangibly embodied in storage medium 1921, which may comprise a device readable medium.

In FIG. 26, processing circuitry 1901 may be configured to communicate with network 1943b using communication subsystem 1931. Network 1943a and network 1943b may be the same network or networks or different network or networks. Communication subsystem 1931 may be configured to include one or more transceivers used to communicate with network 1943b. For example, communication subsystem 1931 may be configured to include one or more transceivers used to communicate with one or more remote transceivers of another device capable of wireless communication such as another WD, UE, or base station of a radio access network (RAN) according to one or more communication protocols, such as IEEE 802.19, CDMA, WCDMA, GSM, LTE, UTRAN, WiMax, or the like. Each transceiver may include transmitter 1933 and/or receiver 1935 to implement transmitter or receiver functionality, respectively, appropriate to the RAN links (e.g., frequency allocations and the like). Further, transmitter 1933 and receiver 1935 of each transceiver may share circuit components, software or firmware, or alternatively may be implemented separately.

In the illustrated embodiment, the communication functions of communication subsystem 1931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1931 may include cellular communication, Wi-Fi communication, Bluetooth communication, and GPS communication. Network 1943b may encompass wired and/or wireless networks such as a local-area network (LAN), a wide-area network (WAN), a computer network, a wireless network, a telecommunications network, another like network or any combination thereof. For example, network 1943b may be a cellular network, a Wi-Fi network, and/or a near-field network. Power source 1913 may be configured to provide alternating current (AC) or direct current (DC) power to components of UE 1900.

The features, benefits and/or functions described herein may be implemented in one of the components of UE 1900 or partitioned across multiple components of UE 1900. Further, the features, benefits, and/or functions described herein may be implemented in any combination of hardware, software or firmware. In one example, communication subsystem 1931 may be configured to include any of the components described herein. Further, processing circuitry 1901 may be configured to communicate with any of such components over bus 1902. In another example, any of such components may be represented by program instructions stored in memory that when executed by processing circuitry 1901 perform the corresponding functions described herein. In another example, the functionality of any of such components may be partitioned between processing circuitry 1901 and communication subsystem 1931. In another example, the non-computationally intensive functions of any of such components may be implemented in software or firmware and the computationally intensive functions may be implemented in hardware.

Figure 20:
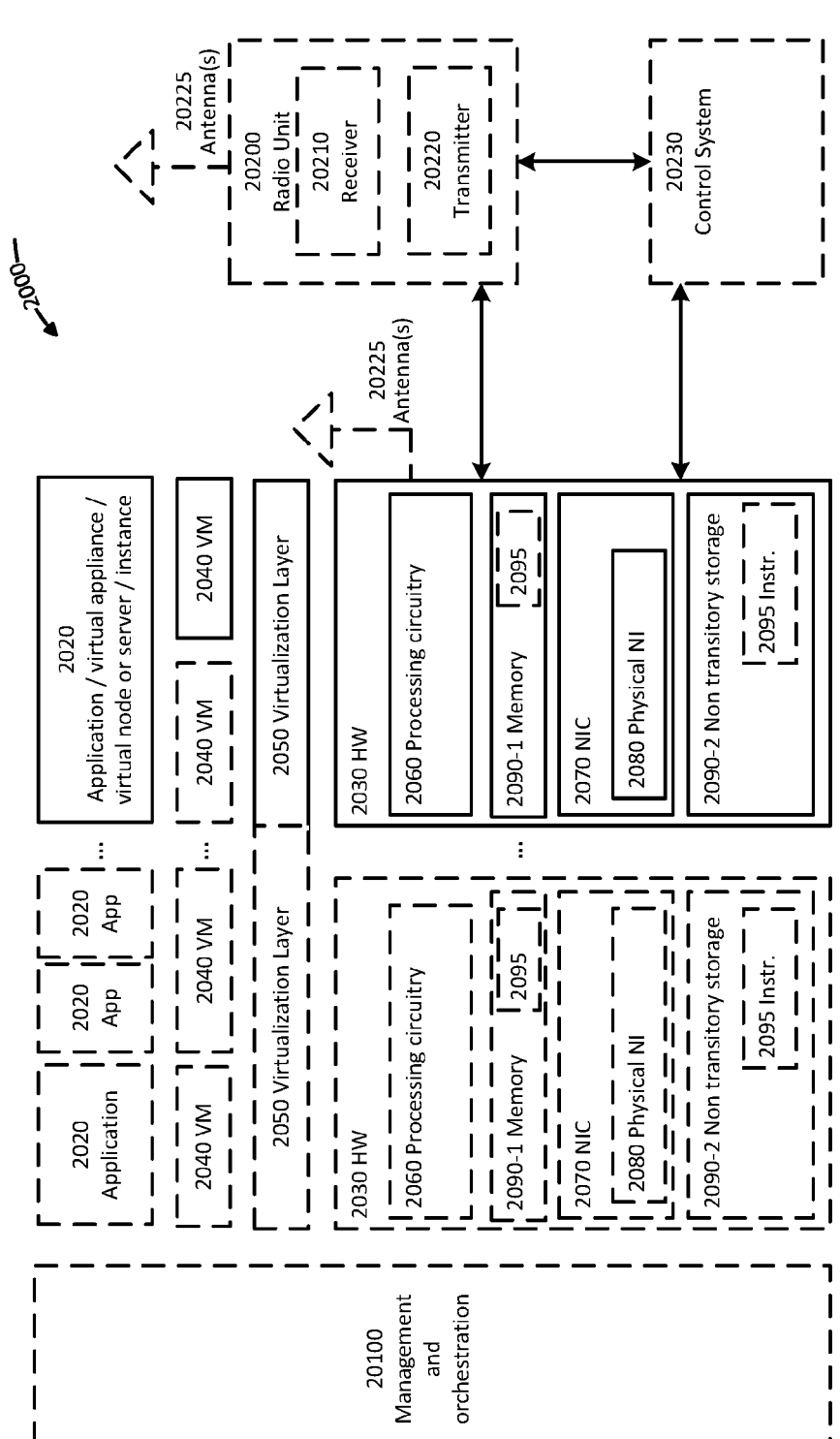
FIG. 20 is a block diagram of a virtualization environment in accordance with some embodiments.

FIG. 20: Virtualization Environment in Accordance with Some Embodiments

FIG. 20 is a schematic block diagram illustrating a virtualization environment 2000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2000 hosted by one or more of hardware nodes 2030. Further, in embodiments in which the virtual node is not a radio access node or does not require radio connectivity (e.g., a core network node), then the network node may be entirely virtualized.

The functions may be implemented by one or more applications 2020 (which may alternatively be called software instances, virtual appliances, network functions, virtual nodes, virtual network functions, etc.) operative to implement some of the features, functions, and/or benefits of some of the embodiments disclosed herein. Applications 2020 are run in virtualization environment 2000 which provides hardware 2030 comprising processing circuitry 2060 and memory 2090. Memory 2090 contains instructions 2095 executable by processing circuitry 2060 whereby application 2020 is operative to provide one or more of the features, benefits, and/or functions disclosed herein.

Virtualization environment 2000, comprises general-purpose or special-purpose network hardware devices 2030 comprising a set of one or more processors or processing circuitry 2060, which may be commercial off-the-shelf (COTS) processors, dedicated Application Specific Integrated Circuits (ASICs), or any other type of processing circuitry including digital or analog hardware components or special purpose processors. Each hardware device may comprise memory 2090-1 which may be non-persistent memory for temporarily storing instructions 2095 or software executed by processing circuitry 2060. Each hardware device may comprise one or more network interface controllers (NICs) 2070, also known as network interface cards, which include physical network interface 2080. Each hardware device may also include non-transitory, persistent, machine-readable storage media 2090-2 having stored therein software 2095 and/or instructions executable by processing circuitry 2060. Software 2095 may include any type of software including software for instantiating one or more virtualization layers 2050 (also referred to as hypervisors), software to execute virtual machines 2040 as well as software allowing it to execute functions, features and/or benefits described in relation with some embodiments described herein.

Virtual machines 2040, comprise virtual processing, virtual memory, virtual networking or interface and virtual storage, and may be run by a corresponding virtualization layer 2050 or hypervisor. Different embodiments of the instance of virtual appliance 2020 may be implemented on one or more of virtual machines 2040, and the implementations may be made in different ways.

During operation, processing circuitry 2060 executes software 2095 to instantiate the hypervisor or virtualization layer 2050, which may sometimes be referred to as a virtual machine monitor (VMM). Virtualization layer 2050 may present a virtual operating platform that appears like networking hardware to virtual machine 2040.

As shown in FIG. 20, hardware 2030 may be a standalone network node with generic or specific components. Hardware 2030 may comprise antenna 20225 and may implement some functions via virtualization. Alternatively, hardware 2030 may be part of a larger cluster of hardware (e.g. such as in a data center or customer premise equipment (CPE)) where many hardware nodes work together and are managed via management and orchestration (MANO) 20100, which, among others, oversees lifecycle management of applications 2020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2040 may be a software implementation of a physical machine that runs programs as if they were executing on a physical, non-virtualized machine. Each of virtual machines 2040, and that part of hardware 2030 that executes that virtual machine, be it hardware dedicated to that virtual machine and/or hardware shared by that virtual machine with others of the virtual machines 2040, forms a separate virtual network elements (VNE).

Still in the context of NFV, Virtual Network Function (VNF) is responsible for handling specific network functions that run in one or more virtual machines 2040 on top of hardware networking infrastructure 2030 and corresponds to application 2020 in FIG. 20.

In some embodiments, one or more radio units 20200 that each include one or more transmitters 20220 and one or more receivers 20210 may be coupled to one or more antennas 20225. Radio units 20200 may communicate directly with hardware nodes 2030 via one or more appropriate network interfaces and may be used in combination with the virtual components to provide a virtual node with radio capabilities, such as a radio access node or a base station.

In some embodiments, some signalling can be effected with the use of control system 20230 which may alternatively be used for communication between the hardware nodes 2030 and radio units 20200.

Figure 21:
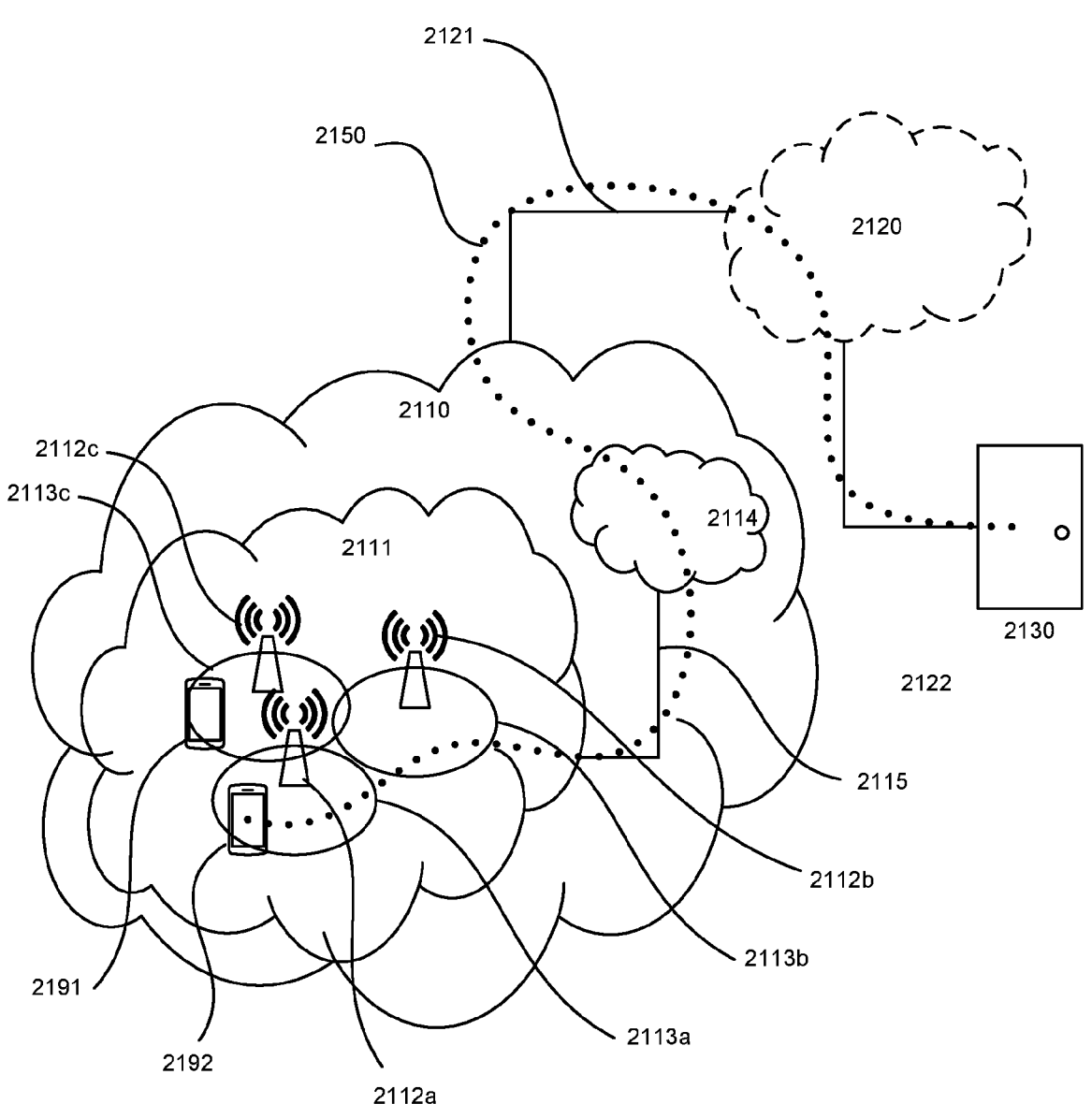
FIG. 21 is a block diagram of a telecommunication network connected via an intermediate network to a host computer in accordance with some embodiments.

FIG. 21: Telecommunication Network Connected Via an Intermediate Network to a Host Computer in Accordance with Some Embodiments.

With reference to FIG. 21, in accordance with an embodiment, a communication system includes telecommunication network 2110, such as a 3GPP-type cellular network, which comprises access network 2111, such as a radio access network, and core network 2114. Access network 2111 comprises a plurality of base stations 2112a, 2112b, 2112c, such as NBs, eNBs, gNBs or other types of wireless access points, each defining a corresponding coverage area 2113a, 2113b, 2113c. Each base station 2112a, 2112b, 2112c is connectable to core network 2114 over a wired or wireless connection 2115. A first UE 2191 located in coverage area 2113c is configured to wirelessly connect to, or be paged by, the corresponding base station 2112c. A second UE 2192 in coverage area 2113a is wirelessly connectable to the corresponding base station 2112a. While a plurality of UEs 2191, 2192 are illustrated in this example, the disclosed embodiments are equally applicable to a situation where a sole UE is in the coverage area or where a sole UE is connecting to the corresponding base station 2112.

Telecommunication network 2110 is itself connected to host computer 2130, which may be embodied in the hardware and/or software of a standalone server, a cloud-implemented server, a distributed server or as processing resources in a server farm. Host computer 2130 may be under the ownership or control of a service provider, or may be operated by the service provider or on behalf of the service provider. Connections 2121 and 2122 between telecommunication network 2110 and host computer 2130 may extend directly from core network 2114 to host computer 2130 or may go via an optional intermediate network 2120. Intermediate network 2120 may be one of, or a combination of more than one of, a public, private or hosted network; intermediate network 2120, if any, may be a backbone network or the Internet; in particular, intermediate network 2120 may comprise two or more sub-networks (not shown).

The communication system of FIG. 21 as a whole enables connectivity between the connected UEs 2191, 2192 and host computer 2130. The connectivity may be described as an over-the-top (OTT) connection 2150. Host computer 2130 and the connected UEs 2191, 2192 are configured to communicate data and/or signaling via OTT connection 2150, using access network 2111, core network 2114, any intermediate network 2120 and possible further infrastructure (not shown) as intermediaries. OTT connection 2150 may be transparent in the sense that the participating communication devices through which OTT connection 2150 passes are unaware of routing of uplink and downlink communications. For example, base station 2112 may not or need not be informed about the past routing of an incoming downlink communication with data originating from host computer 2130 to be forwarded (e.g., handed over) to a connected UE 2191. Similarly, base station 2112 need not be aware of the future routing of an outgoing uplink communication originating from the UE 2191 towards the host computer 2130.

Figure 22:
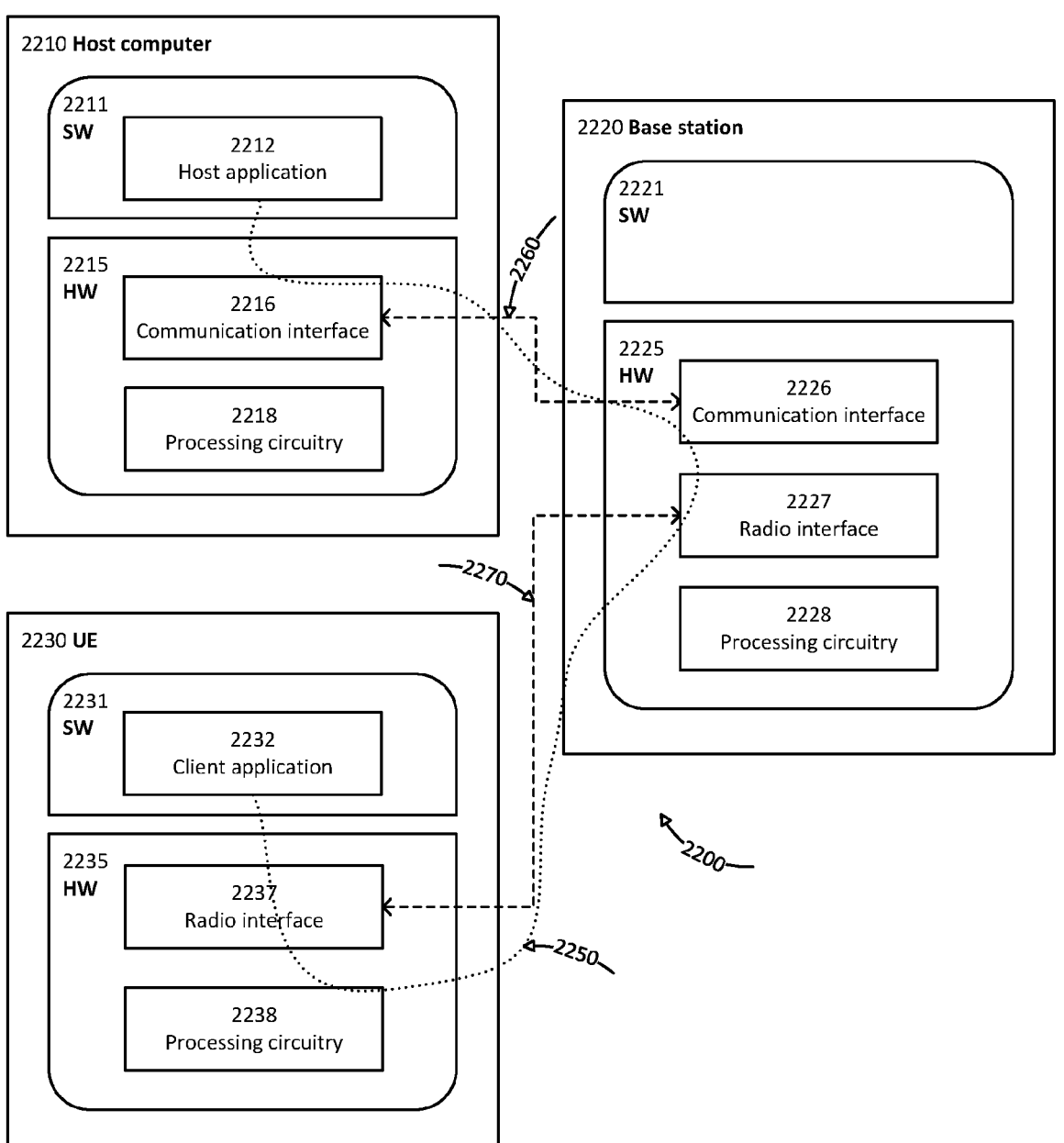
FIG. 22 is a block diagram of a host computer communicating via a base station with a user equipment over a partially wireless connection in accordance with some embodiments.

FIG. 22: Host Computer Communicating Via a Base Station with a User Equipment Over a Partially Wireless Connection in Accordance with Some Embodiments.

Example implementations, in accordance with an embodiment, of the UE, base station and host computer discussed in the preceding paragraphs will now be described with reference to FIG. 22. In communication system 2200, host computer 2210 comprises hardware 2215 including communication interface 2216 configured to set up and maintain a wired or wireless connection with an interface of a different communication device of communication system 2200. Host computer 2210 further comprises processing circuitry 2218, which may have storage and/or processing capabilities. In particular, processing circuitry 2218 may comprise one or more programmable processors, application-specific integrated circuits, field programmable gate arrays or combinations of these (not shown) adapted to execute instructions. Host computer 2210 further comprises software 2211, which is stored in or accessible by host computer 2210 and executable by processing circuitry 2218. Software 2211 includes host application 2212. Host application 2212 may be operable to provide a service to a remote user, such as UE 2230 connecting via OTT connection 2250 terminating at UE 2230 and host computer 2210. In providing the service to the remote user, host application 2212 may provide user data which is transmitted using OTT connection 2250.

Communication system 2200 further includes base station 2220 provided in a telecommunication system and comprising hardware 2225 enabling it to communicate with host computer 2210 and with UE 2230. Hardware 2225 may include communication interface 2226 for setting up and maintaining a wired or wireless connection with an interface of a different communication device of communication system 2200, as well as radio interface 2227 for setting up and maintaining at least wireless connection 2270 with UE 2230 located in a coverage area (not shown in FIG. 22) served by base station 2220. Communication interface 2226 may be configured to facilitate connection 2260 to host computer 2210. Connection 2260 may be direct or it may pass through a core network (not shown in FIG. 22) of the telecommunication system and/or through one or more intermediate networks outside the telecommunication system. In the embodiment shown, hardware 2225 of base station 2220 further includes processing circuitry 2228, which may comprise one or more programmable processors, application-specific integrated circuits, field programmable gate arrays or combinations of these (not shown) adapted to execute instructions. Base station 2220 further has software 2221 stored internally or accessible via an external connection.

Communication system 2200 further includes UE 2230 already referred to. Its hardware 2235 may include radio interface 2237 configured to set up and maintain wireless connection 2270 with a base station serving a coverage area in which UE 2230 is currently located. Hardware 2235 of UE 2230 further includes processing circuitry 2238, which may comprise one or more programmable processors, application-specific integrated circuits, field programmable gate arrays or combinations of these (not shown) adapted to execute instructions. UE 2230 further comprises software 2231, which is stored in or accessible by UE 2230 and executable by processing circuitry 2238. Software 2231 includes client application 2232. Client application 2232 may be operable to provide a service to a human or non-human user via UE 2230, with the support of host computer 2210. In host computer 2210, an executing host application 2212 may communicate with the executing client application 2232 via OTT connection 2250 terminating at UE 2230 and host computer 2210. In providing the service to the user, client application 2232 may receive request data from host application 2212 and provide user data in response to the request data. OTT connection 2250 may transfer both the request data and the user data. Client application 2232 may interact with the user to generate the user data that it provides.

It is noted that host computer 2210, base station 2220 and UE 2230 illustrated in FIG. 22 may be similar or identical to host computer 2130, one of base stations 2112*a*, 2112*b*, 2112*c* and one of UEs 2191, 2192 of FIG. 21, respectively. This is to say, the inner workings of these entities may be as shown in FIG. 22 and independently, the surrounding network topology may be that of FIG. 21.

In FIG. 22, OTT connection 2250 has been drawn abstractly to illustrate the communication between host computer 2210 and UE 2230 via base station 2220, without explicit reference to any intermediary devices and the precise routing of messages via these devices. Network infrastructure may determine the routing, which it may be configured to hide from UE 2230 or from the service provider operating host computer 2210, or both. While OTT connection 2250 is active, the network infrastructure may further take decisions by which it dynamically changes the routing (e.g., on the basis of load balancing consideration or reconfiguration of the network).

Wireless connection 2270 between UE 2230 and base station 2220 is in accordance with the teachings of the embodiments described throughout this disclosure. One or more of the various embodiments may improve the performance of OTT services provided to UE 2230 using OTT connection 2250, in which wireless connection 2270 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection 2250 between host computer 2210 and UE 2230, in response to variations in the measurement results. The measurement procedure and/or the network functionality for reconfiguring OTT connection 2250 may be implemented in software 2211 and hardware 2215 of host computer 2210 or in software 2231 and hardware 2235 of UE 2230, or both. In embodiments, sensors (not shown) may be deployed in or in association with communication devices through which OTT connection 2250 passes; the sensors may participate in the measurement procedure by supplying values of the monitored quantities exemplified above, or supplying values of other physical quantities from which software 2211, 2231 may compute or estimate the monitored quantities. The reconfiguring of OTT connection 2250 may include message format, retransmission settings, preferred routing etc.; the reconfiguring need not affect base station 2220, and it may be unknown or imperceptible to base station 2220. Such procedures and functionalities may be known and practiced in the art. In certain embodiments, measurements may involve proprietary UE signaling facilitating host computer 2210's measurements of throughput, propagation times, latency and the like. The measurements may be implemented in that software 2211 and 2231 causes messages to be transmitted, in particular empty or 'dummy' messages, using OTT connection 2250 while it monitors propagation times, errors etc.

Figure 23:
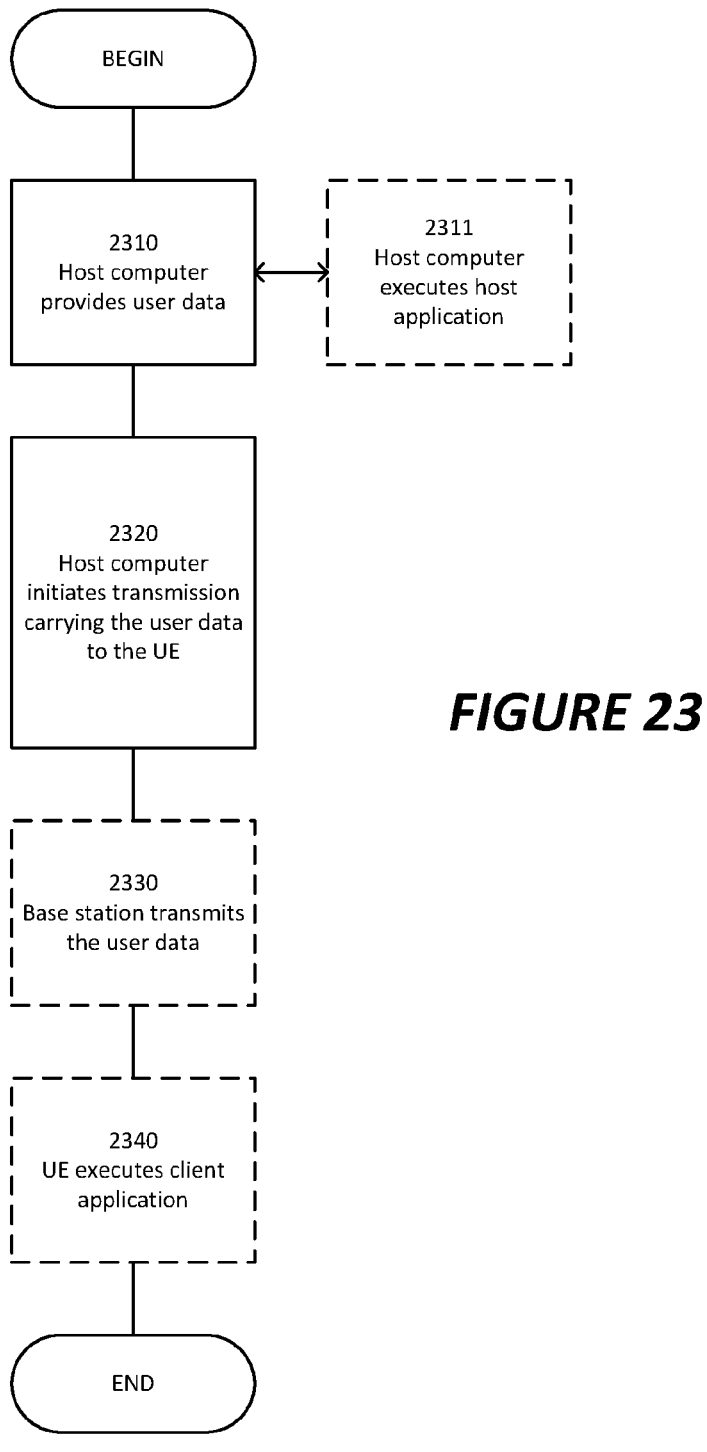
FIG. 23 is a block diagram of methods implemented in a communication system including a host computer, a base station, and a user equipment in accordance with some embodiments.

FIG. 23: Methods Implemented in a Communication System Including a Host Computer, a Base Station and a User Equipment in Accordance with Some Embodiments.

FIG. 23 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 23 will be included in this section. In step 2310, the host computer provides user data. In substep 2311 (which may be optional) of step 2310, the host computer provides the user data by executing a host application. In step 2320, the host computer initiates a transmission carrying the user data to the UE. In step 2330 (which may be optional), the base station transmits to the UE the user data which was carried in the transmission that the host computer initiated, in accordance with the teachings of the embodiments described throughout this disclosure. In step 2340 (which may also be optional), the UE executes a client application associated with the host application executed by the host computer.

Figure 24:
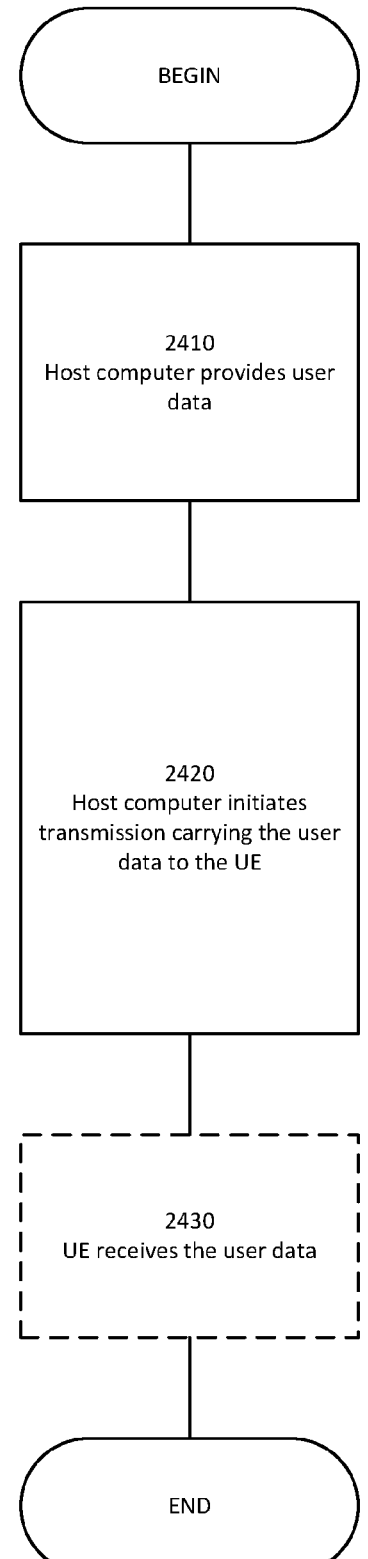
FIG. 24 is a block diagram of methods implemented in a communication system including a host computer, a base station, and a user equipment in accordance with some embodiments.

FIG. 24: Methods Implemented in a Communication System Including a Host Computer, a Base Station and a User Equipment in Accordance with Some Embodiments.

FIG. 24 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 24 will be included in this section. In step 2410 of the method, the host computer provides user data. In an optional substep (not shown) the host computer provides the user data by executing a host application. In step 2420, the host computer initiates a transmission carrying the user data to the UE. The transmission may pass via the base station, in accordance with the teachings of the embodiments described throughout this disclosure. In step 2430 (which may be optional), the UE receives the user data carried in the transmission.

FIG. 25: Methods Implemented in a Communication System Including a Host Computer, a Base Station and a User Equipment in Accordance with Some Embodiments.

FIG. 25 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 25 will be included in this section. In step 2510 (which may be optional), the UE receives input data provided by the host computer. Additionally or alternatively, in step 2520, the UE provides user data. In substep 2521 (which may be optional) of step 2520, the UE provides the user data by executing a client application. In substep 2511 (which may be optional) of step 2510, the UE executes a client application which provides the user data in reaction to the received input data provided by the host computer. In providing the user data, the executed client application may further consider user input received from the user. Regardless of the specific manner in which the user data was provided, the UE initiates, in substep 2530 (which may be optional), transmission of the user data to the host computer. In step 2540 of the method, the host computer receives the user data transmitted from the UE, in accordance with the teachings of the embodiments described throughout this disclosure.

FIG. 26: Methods Implemented in a Communication System Including a Host Computer, a Base Station and a User Equipment in Accordance with Some Embodiments.

FIG. 26 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 26 will be included in this section. In step 2610 (which may be optional), in accordance with the teachings of the embodiments described throughout this disclosure, the base station receives user data from the UE. In step 2620 (which may be optional), the base station initiates transmission of the received user data to the host computer. In step 2630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of operating a distributed unit, DU, of a radio network node in a wireless communication system, comprising:

obtaining a value of an antenna subarray gain, $G_{subarrayAndElement}$, for a radio unit, RU, connected to the DU;

estimating a transmission gain associated with a first downlink channel of the RU based on the antenna subarray gain;

calculating an effective isotropically radiated power, EIRP, level for the first downlink channel based on the estimated transmission gain of the first downlink channel; and adaptively limiting EIRP of downlink signals transmitted by the RU on the first downlink channel based on the estimated transmission gain.

2. The method of claim 1, further comprising obtaining a port-to-antenna mapping gain, $G_{p2a}$, of the RU, wherein the estimated transmission gain of the first downlink channel is estimated based on the port-to-antenna mapping gain, $G_{p2a}$, of the RU.

3. The method of claim 1, wherein the estimated transmission gain of the first downlink channel is based on one or more of a precoding gain, $G_{precoding}$, a tuning gain, $G_{tuning}$, and a boost gain, $G_{boost}$.

4. The method of claim 1, further comprising receiving the antenna subarray gain from the RU.

5. The method of claim 1, further comprising receiving the antenna subarray gain from a local database in the DU.

6. The method of claim 1, further comprising receiving the antenna subarray gain in a network configuration.

7. The method of claim 2, further comprising obtaining the port-to-antenna mapping gain, $G_{p2a}$, of the RU from a local database in the DU.

8. The method of claim 1, wherein adaptively limiting the EIRP of downlink signals transmitted by the RU on the first downlink channel comprises obtaining a power backoff value based on the estimated transmission gain.

9. The method of claim 8, further comprising:

generating a scaling factor based on the power backoff value; and transmitting the scaling factor to the RU.

10. The method of claim 8, further comprising:

generating a scaling factor based on the power backoff value;

applying the scaling factor to modulated data symbols; and transmitting the modulated data symbols to the RU for transmission.

11. The method of claim 1, wherein the estimated transmission gain of the first downlink channel is estimated based on one or more of a precoding gain, $G_{precoding}$, a port-to-antenna mapping gain, $G_{p2a}$, a antenna subarray gain, $G_{subarrayAndElement}$, a tuning gain, $G_{tuning}$, and a boost gain, $G_{boost}$.

12. The method of claim 1, wherein the first downlink channel comprises a physical downlink shared channel associated with a wireless device, and wherein the estimated transmission gain of the first downlink channel, $G_{pdsch}$, is calculated as:

$$G_{pdsch} = G_{precoding} + G_{p2a} + G_{subarrayAndElement} + G_{tuning} + G_{layersplit} + G_{boost}$$

where $G_{layersplit}$ represents a gain associated with a number of MIMO layers transmitted on the first downlink channel.

13. The method of claim 11, wherein the EIRP level for the first downlink channel is calculated as a sum of the estimated transmission gain and the transmission power of the first downlink channel.

14. The method of claim 12, wherein the EIRP level for the first downlink channel is calculated as:

$$EIRP_{pdsch} = G_{pdsch} + TXPower$$

where TXPower represents the transmission power on the first downlink channel.

15. The method of claim 14, further comprising calculating an EIRP backoff as:

$$pdschEirpBackoff = \max(0, EIRP_{pdsch} - maxEirpTh) \qquad 5$$

where maxEirpTh is a maximum EIRP threshold.

* * * * *